(12) United States Patent
Peng et al.

(10) Patent No.: US 12,047,274 B2
(45) Date of Patent: Jul. 23, 2024

(54) PATH COMPUTATION METHOD, STORAGE MEDIUM AND ELECTRONIC APPARATUS

(71) Applicant: ZTE CORPORATION, Guangdong (CN)

(72) Inventors: Shaofu Peng, Guangdong (CN); Feicai Jin, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 344 days.

(21) Appl. No.: 17/615,925

(22) PCT Filed: Jun. 3, 2020

(86) PCT No.: PCT/CN2020/094172
§ 371 (c)(1),
(2) Date: Dec. 2, 2021

(87) PCT Pub. No.: WO2020/244550
PCT Pub. Date: Dec. 10, 2020

(65) Prior Publication Data
US 2022/0321453 A1    Oct. 6, 2022

(30) Foreign Application Priority Data
Jun. 6, 2019 (CN) .......................... 201910491137.4

(51) Int. Cl.
*H04L 45/12* (2022.01)
*H04L 45/50* (2022.01)

(52) U.S. Cl.
CPC ............ *H04L 45/124* (2013.01); *H04L 45/50* (2013.01)

(58) Field of Classification Search
None
See application file for complete search history.

(56) References Cited

U.S. PATENT DOCUMENTS 9,026,632 B2 *  5/2015  Bryskin ................ H04L 45/645
                                                      709/221
9,450,817 B1 *  9/2016  Bahadur ............. H04L 41/0806
(Continued)

FOREIGN PATENT DOCUMENTS

CN    101860473 A    10/2010
CN    102055662 A    5/2011
(Continued)

OTHER PUBLICATIONS

China Patent Office, First Office Action dated Jun. 6, 2022, for corresponding Chinese application 201910491137.4.
(Continued)

*Primary Examiner* — Xavier S Wong
(74) *Attorney, Agent, or Firm* — Li & Cai Intellectual Property (USA) Office

(57) ABSTRACT

The present disclosure provides a path computation method, a non-transitory storage medium, and an electronic apparatus. The path computation method includes: sending a path computation request (PCReq) message to a path computation element (PCE), wherein the PCReq message carries a constraint condition ID including at least one of a protocol ID, a multi-topology ID, a network slice ID, an application ID, or a traffic engineering (TE) target ID, and the PCReq message is configured to instruct the PCE to compute a TE path according to the constraint condition ID; and receiving a path computation reply (PCRep) message returned from the PCE, wherein the PCRep message carries the TE path.

17 Claims, 7 Drawing Sheets

(56) References Cited

U.S. PATENT DOCUMENTS

| | | |
|---|---|---|
| 2010/0220996 A1 | 9/2010 | Lee et al. |
| 2013/0007266 A1* | 1/2013 | Jocha ................ H04L 45/10 |
| | | 709/224 |
| 2015/0249593 A1* | 9/2015 | Alvarez ............. H04L 45/124 |
| | | 370/241 |
| 2015/0271055 A1 | 9/2015 | Wang et al. |
| 2017/0085462 A1* | 3/2017 | Zhou ................. H04L 41/12 |
| 2019/0044934 A1 | 2/2019 | Guan |
| 2020/0092195 A1* | 3/2020 | Ding ................. H04L 45/22 |
| 2020/0304402 A1* | 9/2020 | Kondreddy ........... H04L 45/50 |

FOREIGN PATENT DOCUMENTS

| | | |
|---|---|---|
| CN | 104579946 A | 4/2015 |
| CN | 105515981 A | 4/2016 |
| CN | 108989065 A | 12/2018 |
| EP | 2063585 A1 | 5/2009 |
| WO | WO2009013085 A1 | 1/2009 |
| WO | WO20170190675 A1 | 11/2017 |

OTHER PUBLICATIONS

Ginsberg, et al., "IS-IS TE Attributed per application draft-ietf-isis-te-app-06", Networking Working Group, Internet Draft, Apr. 8, 2019.

Psenak, et al., "Multi-Topology(MT) Routing in OSPF", Network Working Group, Jun. 30, 2007.

Peng, et al., "Packet Network Slicing using Segment Routing draft-peng-lsr-network-slicing-00", Networking Working Group, Internet-Draft, Feb. 25, 2019.

WIPO, International Search Report issued on Aug. 14, 2020.

* cited by examiner

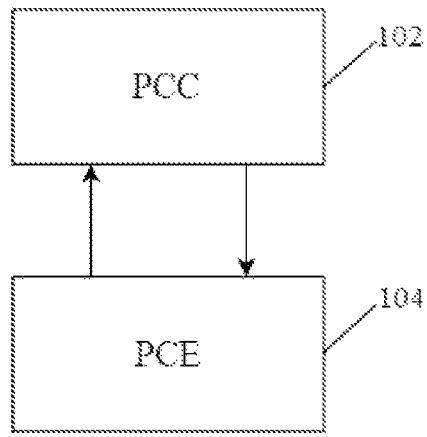

FIG. 1

| A PCC sends a path computation request (PCReq) message to a PCE. The PCReq message carries a constraint condition ID including at least one of a protocol ID, a multi-topology ID, a network slice ID, an application ID, or a TE target ID, and the PCReq message is configured to instruct the PCE to compute a TE path according to the constraint condition ID | S202 |

| The PCC receives a path computation reply (PCRep) message returned from the PCE. The PCRep message carries the TE path | S204 |

FIG. 2

PATH COMPUTATION METHOD, STORAGE MEDIUM AND ELECTRONIC APPARATUS

CROSS-REFERENCE TO RELATED APPLICATION

This application is a National Phase Application filed under 35 U.S.C. 371 as a national stage of PCT/CN2020/094172, filed on Jun. 3, 2020, an application claiming the priority of the Chinese patent application No. 201910491137.4, filed on Jun. 6, 2019, the contents of which are incorporated herein by reference in their entirety.

TECHNICAL FIELD

The present disclosure relates to the field of communications.

BACKGROUND

A path computation element (PCE) is an entity proposed by the Internet Engineering Task Force (IETF) for computing network paths or routes in and applying computation constraints to a Multi-Protocol Label Switching (MPLS) network/Generalized Multi-Protocol Label Switching (GM-PLS) network. The PCE can interact with a path computation client (PCC) to provide a traffic engineering (TE) path meeting a specific constraint condition for the PCC according to a service requirement. In existing technology, while providing the TE path, the PCE typically needs to compute the TE path according to Metric, bandwidth, time delay, affinity, necessary node, or the like. However, with an abundance of service requirements, the method in which the PCE perform path computation cannot meet the current service requirements any more.

No effective solution has proposed yet regarding a technical problem that an existing path computation method cannot meet current service requirements.

SUMMARY

One aspect of the disclosure provides a path computation method applied to a path computation client (PCC). The path computation method includes: sending a path computation request (PCReq) message to a path computation element (PCE), wherein the PCReq message carries a constraint condition ID including at least one of a protocol ID, a multi-topology ID, a network slice ID, an application ID, or a traffic engineering (TE) target ID, and the PCReq message is configured to instruct the PCE to compute a TE path according to the constraint condition ID; and receiving a path computation reply (PCRep) message returned from the PCE, wherein the PCRep message carries the TE path.

Another aspect of the present disclosure provides a path computation method applied to a path computation element (PCE). The path computation method includes: receiving a path computation request (PCReq) message sent from a path computation client (PCC), wherein the PCReq message carries a constraint condition ID including at least one of a protocol ID, a multi-topology ID, a network slice ID, an application ID, or a traffic engineering (TE) target ID; and computing a TE path according to the constraint condition ID and returning a path computation reply (PCRep) message to the PCC, wherein the PCRep message carries the TE path.

Another aspect of the present disclosure provides a path computation method applied to a path computation element (PCE). The path computation method includes: acquiring a preset constraint condition ID, and computing a traffic engineering (TE) path according to the constraint condition ID, the constraint condition ID including at least one of a protocol ID, a multi-topology ID, a network slice ID, an application ID, or a TE target ID; and sending a path computation initiation (PCInitiate) message or a path computation update (PCUpd) message to a path computation client (PCC), wherein the PCInitiate or PCUpd message carries the TE path.

Another aspect of the present disclosure provides a path computation method applied to a path computation client (PCC). The path computation method includes: receiving a path computation initiation (PCInitiate) message or a path computation update (PCUpd) message sent from a path computation element (PCE), wherein the PCInitiate or PCUpd message carries a traffic engineering (TE) path that is computed by the PCE according to acquired preset constraint condition information, wherein the constraint condition ID including at least one of a protocol ID, a multi-topology ID, a network slice ID, an application ID, or a TE target ID.

Another aspect of the present disclosure provides a storage medium having a computer program stored thereon, wherein the computer program is configured to, when executed, cause the above path computation methods to be implemented.

Another aspect of the present disclosure provides an electronic apparatus, including a memory and a processor, wherein the memory has a computer program stored thereon, and the processor is configured to execute the computer program to perform the above methods.

BRIEF DESCRIPTION OF THE DRAWINGS

The accompanying drawings described herein are intended to provide a further understanding of the present disclosure, and are intended to be a part of the present disclosure. Exemplary embodiments of the present disclosure and descriptions thereof are for explaining the present disclosure and do not constitute an undue limitation of the present disclosure. In the accompanying drawings:

FIG. 1 is a diagram of functional modules in a path computation system according to an embodiment of the present disclosure;

FIG. 2 is a flowchart diagram of a path computation method according to an embodiment of the present disclosure;

DETAILED DESCRIPTION

Figure 3:
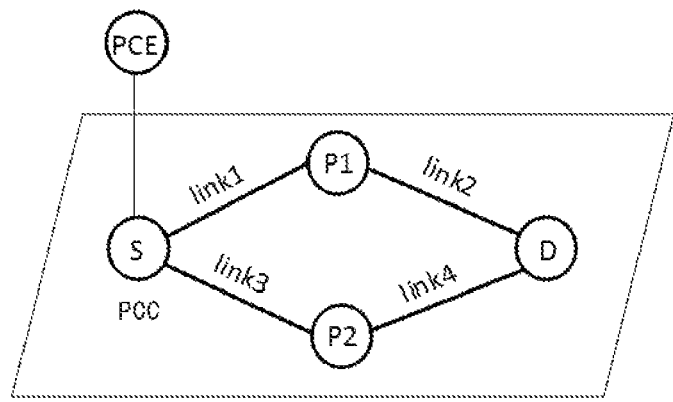
FIG. 3 is a schematic diagram of network links according to an embodiment of the disclosure.

The present disclosure will be described in detail below with reference to the accompanying drawings in conjunction with the embodiments. It should be noted that embodiments of the present application and features therein may be combined with each other in any manner as long as they are not contradictory.

It should be also noted that terms "first", "second", and the like in the description, claims and the accompanying drawings of the disclosure are used for a purpose of distinguishing similar objects instead of indicating a specific order or sequence.

To further illustrate an implementation of path computation in the present disclosure, interaction between a path computation element (PCE) and a path computation client (PCC) and a process of the path computation will be described first.

The interaction between the PCC and the PCE may be implemented through a Path Computation Element Communication Protocol (PCEP). The PCEP defines a set of mechanisms for information interaction between the PCE and the PCC so that the PCC may request the PCE to compute a traffic engineering (TE) path from a source node to a destination node and meeting a specific constraint condition, or so that the PCE actively delivers the TE path meeting the specific constraint condition to the PCC.

FIG. 1 is a diagram of functional modules in a path computation system according to an embodiment of the present disclosure. As shown in FIG. 1, the path computation system includes a PCC 102 and a PCE 104.

The PCC 102 is configured to send a path computation request (PCEP Request, PCReq) message to the PCE 104. The PCReq message carries a constraint condition identification (ID) including at least one of a protocol ID, a multi-topology ID, a network slice ID, an application ID, or a TE target ID.

The PCE 104 is configured to compute a TE path according to the constraint condition ID, and return a path computation reply (PCEP Reply, PCRep) message to the PCC 102. The PCRep message carries the TE path.

Through the path computation system of the embodiment, the PCC can send the PCReq message to the PCE, the PCReq message carrying the constraint condition ID including at least one of the protocol ID, the multi-topology ID, the network slice ID, the application ID, or the TE target ID, and the PCE can compute the TE path according the constraint condition ID carried in the received PCReq message and return the PCRep message to the PCC, the PCRep message carrying the TE path. Therefore, the path computation system provided in this embodiment can solve a technical problem that an existing path computation method cannot meet current service requirements, and achieve an effect of expanding the service requirements to which the path computation is applicable.

According to an embodiment of the present disclosure, the PCE in the path computation system may perform the path computation according to a constraint condition in a case where the PCC has an explicit object (such as a protocol, a topology, a network slice, and the like), so that applicable scenarios of the TE path computation performed by the PCE is increased, and the PCE is more adapted to path requirements formed from the service requirements of the PCC in different scenarios.

According to an embodiment of the present disclosure, before the PCC sends the PCReq message to the PCE, a node where the PCC is located further includes a configuration process on the constraint condition, which may include delivering configuration information through a control device, or performing local configuration using a Command Line Interface (CLI). Generally, the control device may consist of a controller or a network management device.

The delivering of the configuration information through the control device includes configuring the constraint condition by the control device according to the service requirements, and sending the constraint condition ID corresponding to the constraint condition in the configured constraint condition to the PCC, or sending the configured constraint condition as well as the constraint condition ID corresponding to the constraint condition to the PCC, so that the PCC sends the PCReq message carrying the constraint condition ID to the PCE for the path computation. For example, when the service requirements require using a specified protocol as a consideration factor of the path computation, the control device acquires an ID of the specific protocol, and sends the protocol ID to the PCC so that the PCC carries the protocol ID in the PCReq message for sending.

The configuration process on the constraint condition may also adopt a CLI local configuration. In this configuration manner, the control device does not need to participate in the configuration process of the constraint condition. Instead, the node where the PCC is located directly completes the configuration process of the constraint condition and acquisition and transmission of the constraint condition ID through the CLI according to the service requirements. The specific manner of the configuration adopted is not limited in the present application.

The controller to which the PCE belongs may acquire network topology information through a North-Bound Distribution of Link-State and Traffic Engineering (TE) Information Using BGP (BGP-LS) protocol. The network topology information may include various objects, such as a link-state database corresponding to a plurality of different source protocols and protocol instances, a plurality of sub-topologies partitioned by an Interior Gateway Protocol (IGP) and a Multi-Topology Routing (MTR), a plurality of network slices partitioned by an Administrative Instance Identifier (AII), a plurality of different applications and their corresponding TE parameters, and so on.

According to an embodiment of the present disclosure, the PCE may perform the TE path computation according to the constraint condition ID carried in the PCReq message sent from the PCC. That is, the PCE may select a path matching the constraint condition corresponding to the constraint condition ID in the network topology information.

According to an embodiment of the present disclosure, the process of carrying the constraint condition ID in the PCReq message sent from the PCC to the PCE may be implemented by adding a field representing the constraint condition ID to an object field in a format of the PCReq message, so that the constraint condition ID is carried in the PCReq message.

According to an embodiment of the present disclosure, after receiving the PCReq message, the PCE can read the field corresponding to the constraint condition ID in the object field of the PCReq message to acquire the constraint condition ID, and thus know that the object indicated by the constraint condition ID should be considered as one of the factors of the path computation. It should be noted that there are various manners for adding the field representing the constraint condition ID to the object field in the format of the PCReq message, such as adding the field representing the constraint condition ID to a common object header, and field manners are listed below by way of specific embodiments. It will be appreciated that any method that enables the constraint condition ID to be carried in the PCReq message falls within the scope of the present disclosure, which is not limited herein.

In the constraint condition ID carried in the PCReq message according to the embodiment of the present disclosure, the protocol ID is configured to indicate a link-state database corresponding to a specified protocol, the multi-topology ID is configured to indicate a specified topology in the link-state database, the network slice ID is configured to indicate a specified network slice in the link-state database, the application ID is configured to indicate a specified application parameter in the link-state database, and the TE target ID is configured to indicate a TE target with a definite meaning.

According to an embodiment of the present disclosure, the TE target with the definite meaning means that a set of constraint conditions is defined by one TE target. For example, the constraint conditions commonly seen in the path computation, such as bandwidth, delay, Metric, affinity, etc., are aggregated and positioned as one TE target to be used in subsequent path computation.

According to an embodiment of the present disclosure, the protocol ID may include at least one of a source protocol type ID or a protocol instance number ID. When the PCReq message carries the protocol ID, the protocol ID may be configured to indicate the link-state database corresponding to which source protocol and/or protocol instance number is used as the constraint condition to perform the TE path computation.

When the PCReq message carries the multi-topology ID, the multi-topology ID may be configured to indicate which sub-topology in the specified link-state database is used for the TE path computation.

When the PCReq message carries the network slice ID, the network slice ID may be configured to indicate which network slice in the specified link-state database is used for the TE path computation.

According to an embodiment of the present disclosure, when the PCReq message carries the application ID, the application ID may be configured to indicate parameters corresponding to which application in the specified link-state database are used for the TE path computation. Depending on different types of applications, the application ID may generally include a standard application ID and a user defined (or non-standard) application ID.

When the PCReq message carries the TE target ID, the TE target ID may be configured to indicate replacing a set of other constraint conditions with the TE target with the definite meaning, and then the PCE may directly perform the TE path computation according to the TE target indicated by the TE target ID.

According to an embodiment of the present disclosure, before the TE target ID is carried in the PCReq message, the TE target may be further configured. According to an embodiment of the present disclosure, TE target information may be sent to the PCC and the PCE by the control device, respectively. The TE target information includes the TE target ID, TE target configuration and a correspondence relation between the TE target ID and the TE target configuration. The TE target configuration refers to a set of pre-configured constraint conditions. After the control device delivers the TE target configuration and the TE target ID together with the correspondence relation between the TE target ID and the TE target configuration to both the PCC and the PCE, the PCC can directly indicate the set of the pre-configured constraint conditions through the TE target ID during interaction with the PCE without carrying a plurality of constraint conditions in the PCReq message. Meanwhile, the PCE can also directly acquire the constraint condition to be considered according to the TE target, or even directly acquire the corresponding TE path when the constraint condition in the PCReq message contains only the TE target, thereby effectively reducing computation operations during the TE path computation.

According to an embodiment of the present disclosure, computation failure may occur during the TE path computation by the PCE, that is, the PCE cannot compute the TE path according to the constraint condition ID carried in the PCReq message. In this case, the PCRep message returned from the PCE to the PCC may further carry a cause for the failure of the TE path computation, so that the PCC or the control device can adjust the constraint condition in time.

FIG. 2 is a flowchart diagram of a path computation method according to an embodiment of the present disclosure. As shown in FIG. 2, the path computation method includes operations S202 and S204.

At operation S202, a PCC sends a path computation request (PCReq) message to a PCE. The PCReq message carries a constraint condition ID including at least one of a protocol ID, a multi-topology ID, a network slice ID, an application ID, or a TE target ID, and the PCReq message is configured to instruct the PCE to compute a TE path according to the constraint condition ID.

At operation S204, the PCC receives a path computation reply (PCRep) message returned from the PCE. The PCRep message carries the TE path.

Through the path computation method of the embodiment, the PCC can send the PCReq message to the PCE, the PCReq message carrying the constraint condition ID including at least one of the protocol ID, the multi-topology ID, the network slice ID, the application ID, or the TE target ID, and the PCE can compute the TE path according the constraint condition ID carried in the received PCReq message and return the PCRep message to the PCC, the PCRep message carrying the TE path. Therefore, the path computation method provided in this embodiment can solve a technical problem that an existing path computation method cannot meet current service requirements, and achieve an effect of expanding the service requirements to which the path computation is applicable.

According to an embodiment of the present disclosure, the PCE in the path computation method may perform the path computation according to a constraint condition in a case where the PCC has an explicit object (such as a protocol, a topology, a network slice, and the like), so that applicable scenarios of the TE path computation performed by the PCE is increased, and the PCE is more adapted to path requirements formed from the service requirements of the PCC in different scenarios.

According to an embodiment of the present disclosure, before the operation S202, the method may further include a configuration process on the constraint condition. According to an embodiment of the present disclosure, the configuration process may include delivering configuration information through a control device, or performing local configuration using a CLI. Generally, the control device may consist of a controller or a network management device.

The delivering of the configuration information through the control device includes configuring the constraint condition by the control device according to the service requirements, and sending the constraint condition ID corresponding to the constraint condition in the configured constraint condition to the PCC, or sending the configured constraint condition as well as the constraint condition ID corresponding to the constraint condition to the PCC, so that the PCC sends the PCReq message carrying the constraint condition ID to the PCE for the path computation. For example, when the service requirements require using a specified protocol as a consideration factor of the path computation, the control device acquires an ID of the specific protocol, and sends the protocol ID to the PCC so that the PCC carries the protocol ID in the PCReq message for sending.

The configuration process on the constraint condition may also adopt a CLI local configuration. In this configuration manner, the control device does not need to participate in the configuration process of the constraint condition. Instead, the node where the PCC is located directly completes the configuration process of the constraint condition and acquisition and transmission of the constraint condition ID through the CLI according to the service requirements. The specific manner of the configuration process adopted is not limited in the present application.

The controller to which the PCE belongs may acquire network topology information through a North-Bound Distribution of Link-State and Traffic Engineering (TE) Information Using BGP (BGP-LS) protocol. The network topology information may include various objects, such as a link-state database corresponding to a plurality of different source protocols and protocol instances, a plurality of sub-topologies partitioned by an Interior Gateway Protocol (IGP) and a Multi-Topology Routing (MTR), a plurality of network slices partitioned by an Administrative Instance Identifier (AII), a plurality of different applications and their corresponding TE parameters, and so on.

According to an embodiment of the present disclosure, the PCE may perform the TE path computation according to the constraint condition ID carried in the PCReq message sent from the PCC. That is, the PCE may select a path matching the constraint condition corresponding to the constraint condition ID in the network topology information.

According to an embodiment of the present disclosure, the process of carrying the constraint condition ID in the PCReq message sent from the PCC to the PCE may be implemented by adding a field representing the constraint condition ID to an object field in a format of the PCReq message, so that the constraint condition ID is carried in the PCReq message.

According to an embodiment of the present disclosure, after receiving the PCReq message, the PCE can read the field corresponding to the constraint condition ID in the object field of the PCReq message to acquire the constraint condition ID, and thus know that the object indicated by the constraint condition ID should be considered as one of the factors of the path computation. It should be noted that there are various manners for adding the field representing the constraint condition ID to the object field in the format of the PCReq message, such as adding the field representing the constraint condition ID to a common object header, and field manners are listed below by way of specific embodiments. It will be appreciated that any method that enables the constraint condition ID to be carried in the PCReq message falls within the scope of the present disclosure, which is not limited herein.

In the constraint condition ID carried in the PCReq message according to this embodiment, the protocol ID is configured to indicate a link-state database corresponding to a specified protocol, the multi-topology ID is configured to indicate a specified topology in the link-state database, the network slice ID is configured to indicate a specified network slice in the link-state database, the application ID is configured to indicate a specified application parameter in the link-state database, and the TE target ID is configured to indicate a TE target with a definite meaning.

According to an embodiment of the present disclosure, the TE target with the definite meaning means that a set of constraint conditions is defined by one TE target. For example, the constraint conditions commonly seen in the path computation, such as bandwidth, delay, Metric, affinity, etc., are aggregated and positioned as one TE target to be used in subsequent path computation.

According to an embodiment of the present disclosure, the protocol ID may include at least one of a source protocol type ID or a protocol instance number ID. When the PCReq message carries the protocol ID, the protocol ID may be configured to indicate the link-state database corresponding to which source protocol and/or protocol instance number is used as the constraint condition to perform the TE path computation.

When the PCReq message carries the multi-topology ID, the multi-topology ID may be configured to indicate which sub-topology in the specified link-state database is used for the TE path computation.

When the PCReq message carries the network slice ID, the network slice ID may be configured to indicate which network slice in the specified link-state database is used for the TE path computation.

According to an embodiment of the present disclosure, when the PCReq message carries the application ID, the application ID may be configured to indicate parameters corresponding to which application in the specified link-state database are used for the TE path computation. Depending on different types of applications, the application ID may generally include a standard application ID and a user defined (or non-standard) application ID.

According to an embodiment of the present disclosure, when the constraint condition ID includes the TE target ID, before the operation S202, the method further includes: acquiring TE target information. The TE target information is sent from the control device to the PCC and the PCE, and carries the TE target ID, TE target configuration and a correspondence relation between the TE target ID and the TE target configuration. The TE target configuration is configured to indicate a set of pre-configured constraint conditions.

According to an embodiment of the present disclosure, before the TE target ID is carried in the PCReq message, the TE target needs to be further configured. According to an embodiment of the present disclosure, the TE target information may be sent to the PCC and the PCE by the control device, respectively. The TE target information includes the TE target ID, TE target configuration and the correspondence relation between the TE target ID and the TE target configuration. The TE target configuration refers to a set of pre-configured constraint conditions. After the control device delivers the TE target configuration and the TE target ID together with the correspondence relation between the TE target ID and the TE target configuration to both the PCC and the PCE, the PCC can directly indicate the set of the pre-configured constraint conditions through the TE target ID during interaction with the PCE without carrying a plurality of constraint conditions in the PCReq message. Meanwhile, the PCE can also directly acquire the constraint condition to be considered according to the TE target, or even directly acquire the corresponding TE path when the constraint condition in the PCReq message contains only the TE target, thereby effectively reducing computation operations during the TE path computation.

According to an embodiment of the present disclosure, in the operation S204, in a case where the PCE fails to compute the TE path according to the constraint condition ID, the PCRep message further carries a cause for the failure of the TE path computation.

According to an embodiment of the present disclosure, in this case, the PCRep message returned from the PCE to the PCC may further carry the cause for the failure of the TE path computation, so that the PCC or the control device can adjust the constraint condition in time.

The path computation method described in the present embodiment will be described in detail below with reference to a plurality of specific embodiments.

Figure 4:
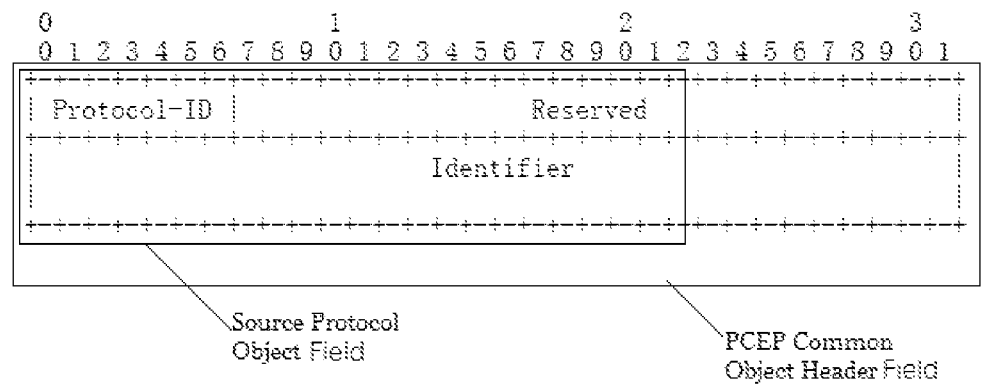
FIG. 4 is a diagram of a package structure of a PCReq message according to an embodiment of the present disclosure.

FIG. 3 is a schematic diagram of network links according to an embodiment of the disclosure. In the following embodiment, the path computation is performed based on the network links shown in FIG. 3. FIG. 4 is a diagram of a package format of a PCReq message according to an embodiment of the present disclosure.

In a case that an Intermediate System—Intermediate System (ISIS) protocol and an Open Shortest Path First (OSPF) protocol are both deployed in a physical network, as shown in FIG. 3, all nodes, including S, P1, P2, D, and all links, including link1, link2, link3, and link4, in the network need to be configured to join level2 of ISIS instance 1, and join OSPFv2 instance 1. That is, the constraint condition configured for each node and each link in the network is both joint in level2 of ISIS instance 1 and OSPFv2 instance 1.

For the above two IGP instance, i.e., ISIS instance 1 and OSPFv2 instance 1, each node and each link in the network shown in FIG. 3 may be correspondingly configured with values of IGP parameters and TE parameters.

When the configuration is completed, the controller to which the PCE belongs collects the network topology information through the BGP-LS protocol. At this time, the controller may collect two link-state databases, i.e., a link-state database generated by the protocol ISIS level2 with an instance number 1, and a link-state database generated by the protocol OSPFv2 with an instance number 1.

According to an embodiment of the present disclosure, the PCC at the node S sends the PCReq message to the PCE to request the path computation. The PCReq message carries the constraint condition ID characterizing the above protocols and the above protocol instance numbers. The constraint condition ID is a constraint condition that is configured to identify joining a protocol type of the ISIS level2 with a protocol instance number 1, or a constraint condition that is configured to identify joining a protocol type of the OSPFv2 with a protocol instance number 1. The PCReq message instructs the PCE to perform the path computation according to the link-state database generated by the protocol ISIS level2 with the instance number 1, and the link-state database generated by the protocol OSPFv2 with the instance number 1.

As shown in FIG. 4, a new Source Protocol Object of Object field may be added to a PCEP Common Object Header field of the PCReq message, and the Source Protocol Object field consists of a source Protocol ID field and a protocol implementation identifier (Identifier) field. According to an embodiment of the present disclosure, the Protocol ID field may be set to 3, and the Identifier field may be set to 1, so as to indicate that the specified link-state database in the constraint condition is the link-state database generated by the protocol OSPFv2 with the instance number 1. Thereby, it may be indicated in the PCReq message that the link-state database serving as the constraint condition is the link-state database generated by the protocol OSPFv2 with the instance number 1.

After receiving the PCReq message, the PCE may acquire the Protocol ID field and the Identifier field in the PCReq message, thereby performing the TE path computation according to the link-state database generated by the protocol OSPFv2 with the instance number 1, carrying the computed TE path in the PCRep message, and returning the PCRep message to the PCC.

According to an embodiment of the present disclosure, in addition to the specified link-state database being the link-state database generated by the protocol OSPFv2 with the instance number 1, the constraint condition may further include other necessary contents, such as a source node and a destination node (in this specific embodiment, for example, the source node S, and the destination node D), bandwidth, time delay, Metric, affinity, and so on.

In a case where the PCReq message does not carry the above protocol ID, that is, the constraint condition does not limit the link-state database corresponding to the specified source protocol type or the protocol instance number, the source protocol is not considered in the TE path computation.

Figure 5:
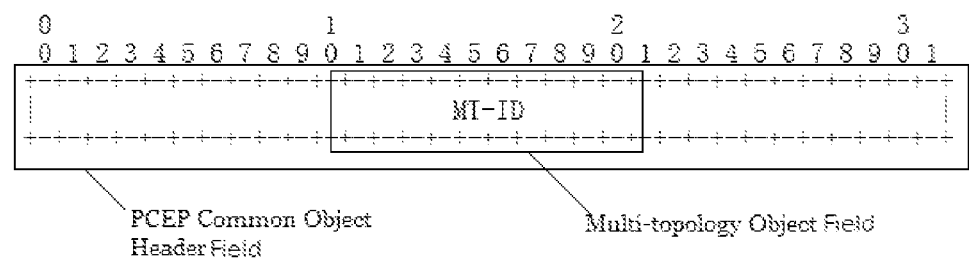
FIG. 5 is a diagram of a package structure of a PCReq message according to another embodiment of the present disclosure.

FIG. 5 is a package structure diagram of a PCReq message according to another embodiment of the present disclosure.

In a case that an IGP Multiple Topology (MT) is deployed in a physical network, as shown in FIG. 3, all nodes, including S, P1, P2, D, and all links, including link1, link2, link3, and link4, in the network join level2 of ISIS instance 1, where link1 and link2 join MT5 and link3 and link4 join MT6. That is, the constraint condition configured for each node and each link in the network is joining level2 of ISIS instance 1, while link1 and link2 join MT5 and link3 and link4 join MT6.

For the level2 of ISIS instance 1 and the corresponding two sub-topologies MT5 and MT6 in the constraint condition, each node and each link in the network shown in FIG. 3 may be correspondingly configured with values of IGP parameters and TE parameters. In this embodiment, it means that each node and each link are configured to join level2 of ISIS instance 1, and respective parameters are configured for link1 and link2 to indicate joining MT5, while respective parameters are configured for link3 and link4 to indicate being configured to join MT6. In this embodiment, MT5 and MT6 are both sub-topologies in the link-state database indicated by level2 of ISIS instance 1.

When the configuration is completed, the controller to which the PCE belongs collects the network topology information through the BGP-LS. At this time, the controller may collect a link-state database generated by the protocol ISIS level2 with an instance number 1, and the two sub-topologies MT5 and MT6 contained in the link-state database, where MT5 indicates an object to which link1 and link2 are joined, while MT6 indicates an object to which link3 and link4 are joined.

According to an embodiment of the present disclosure, the PCC at the node S sends the PCReq message to the PCE to request the path computation. The PCReq message carries the constraint condition ID characterizing the above multi-topology information. The constraint condition ID is a multi-topology ID (MT-ID) that is configured to identify an object jointing MT. It should be noted that since MT5 and MT6 both belong to sub-topologies in the link-state database generated by ISIS level2 with the instance number 1, while MT5 and MT6 are identified by the constraint condition ID, the link-state database of the protocol ISIS level2 with the instance number 1 also need to be further identified. Generally, the identification may be implemented by adding an additional Protocol ID and Identifier in the PCReq message, so as to instruct the PCE to perform the path computation according to the sub-topology MT5 or MT6 contained in the link-state database of ISIS level2 with the instance number 1; or by not specifying the Protocol ID and the Identifier in the PCReq message, but selecting the specified link-state database for computation by the controller according to a local policy. When the above Protocol ID and Identifier need to be carried in the PCReq message, the method for adding the Protocol ID and the Identifier corresponds to the content described with reference to FIG. 4, which is not repeated here.

As shown in FIG. 5, a new Multi-topology Object field is added to the PCEP Common Object Header field of the PCReq message, and the Multi-topology Object field includes an MT-ID field, indicating which sub-topology in the link-state database the TE path computation is based on. Specifically, the MT-ID field is set to MT-IDs 5 and 6, indicating that the two sub-topology objects to be added to the constraint condition are MT5 and MT6, respectively.

After receiving the PCReq message, the PCE may acquire the MT-ID field in the PCReq message, thereby performing the TE path computation according to the indication of the MT-IDs, i.e., MT5 and MT6, carrying the computed TE path in the PCRep message, and returning the PCRep message to the PCC. It should be noted that, in the configuration of this embodiment, link1 and link2 join MT5 and link3 and link4 join MT6. This configuration manner has been recorded in the link-state database, and the PCE may clarify the correspondence relation between the links and the sub-topologies according to the record in the link-state database.

According to an embodiment of the present disclosure, in addition to specifying the sub-topology objects as MT5 and MT6, the constraint condition may further include other necessary contents, such as a source node and a destination node (in this specific embodiment, for example, the source node S, and the destination node D), bandwidth, time delay, Metric, affinity, and so on.

In a case where the PCReq message does not carry the above multi-topology IDs, that is, the constraint condition does not limit the specified sub-topology object, the TE path computation may be based on a default topology, which is usually MT-ID 0.

Figure 6:
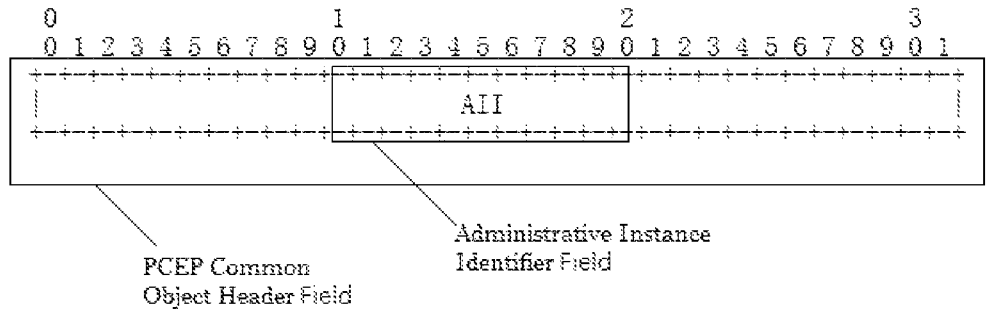
FIG. 6 is a diagram of a package structure of a PCReq message according to another embodiment of the present disclosure.

FIG. 6 is a diagram of a package structure of a PCReq message according to another embodiment of the present disclosure.

In a case where network slices or Administrative Instance Identifiers (AIIs) are deployed in a physical network, as shown in FIG. 3, all nodes, including S, P1, P2, D, and all links, including link1, link2, link3, and link4, in the network join level2 of ISIS instance 1, where link1 and link2 join slice 1, i.e., AII1, and the link3 and link4 join slice 2, i.e., AII2 That is, the constraint condition configured for each node and each link in the network is joining level2 of ISIS instance 1, while link1 and link2 join AII1 and link3 and link4 join AII2.

For the level2 of ISIS instance 1 and the corresponding two network slices AII1 and AII2 in the constraint condition, each node and each link in the network shown in FIG. 3 may be correspondingly configured with values of IGP parameters and TE parameters. In this embodiment, it means that each node and each link are configured to join level2 of ISIS instance 1, and respective parameters are configured for link1 and link2 to indicate joining AII1, while respective parameters are configured for link3 and link4 to indicate being configured to join AII2 In this embodiment, AII1 and AII2 are both network slices in the link-state database indicated by level2 of ISIS instance 1.

When the configuration is completed, the controller to which the PCE belongs collects the network slice topology information through the BGP-LS. At this time, the controller may collect a link-state database generated by the protocol ISIS level2 with an instance number 1, and the two network slices AII1 and AII2 contained in the link-state database, where AII1 indicates an object to which link1 and link2 are joined, while AII2 indicates an object to which link3 and link4 are joined.

According to an embodiment of the present disclosure, the PCC at the node S sends the PCReq message to the PCE to request the path computation. The PCReq message carries the constraint condition ID characterizing the above network slice information. The constraint condition ID is a network slice ID (AII-ID) that is configured to identify the joined AII object. It should be noted that since AII1 and AII2 both belong to network slices in the link-state database generated by ISIS level2 with the instance number 1, while AII1 and AII2 are identified by the constraint condition ID, the link-state database of the protocol ISIS level2 with the instance number 1 also need to be further identified. Generally, the identification may be implemented by adding an additional Protocol ID and Identifier in the PCReq message, so as to instruct the PCE to perform the path computation according to the network slice AII1 or AII2 contained in the link-state database of ISIS level2 with the instance number 1, or by not specifying the Protocol ID and the Identifier in the PCReq message, but selecting the specified link-state database for computation by the controller according to a local policy. When the above Protocol ID and Identifier need to be carried in the PCReq message, the method for adding the Protocol ID and the Identifier corresponds to the content described with reference to FIG. 4, which is not repeated here.

As shown in FIG. 6, a new network slice Object or Administrative Instance Identifier field is added to the PCEP Common Object Header field of the PCReq message, and the Administrative Instance Identifier field indicates which network slice in the link-state database the TE path computation is based on. According to an embodiment of the present disclosure, the Administrative Instance Identifier field is set to AII1 and AII2, indicating that the two network slice objects to be added to the constraint condition are AII1 and AII2, respectively.

After receiving the PCReq message, the PCE may acquire the AII field in the PCReq message, thereby performing the TE path computation according to the indication of the AIIs, i.e., AII1 and AII2, carrying the computed TE path in the PCRep message, and returning the PCRep message the PCC. It should be noted that in the configuration of this specific embodiment, link1 and link2 join AII1, and link3 and link4 join AII2 This configuration manner has been recorded in the link-state database, and the PCE may clarify the correspondence relation between the links and the network slices according to the record in the link-state database.

According to an embodiment of the present disclosure, in addition to specifying the network slice objects as AII1 and AII2, the constraint condition may further include other necessary contents, such as a source node and a destination node (in this specific embodiment, for example, the source node S, and the destination node D), bandwidth, time delay, Metric, affinity, and so on.

In a case where the PCReq message does not carry the above network slice IDs, that is, the constraint condition does not limit the specified network slice object, the TE path computation may be based on a default network slice, which is usually AII0.

In addition, values of AII follow distribution of network slice IDs according to draft-peng-lsr-network-slicing-00 and extension thereof.

Figure 7:
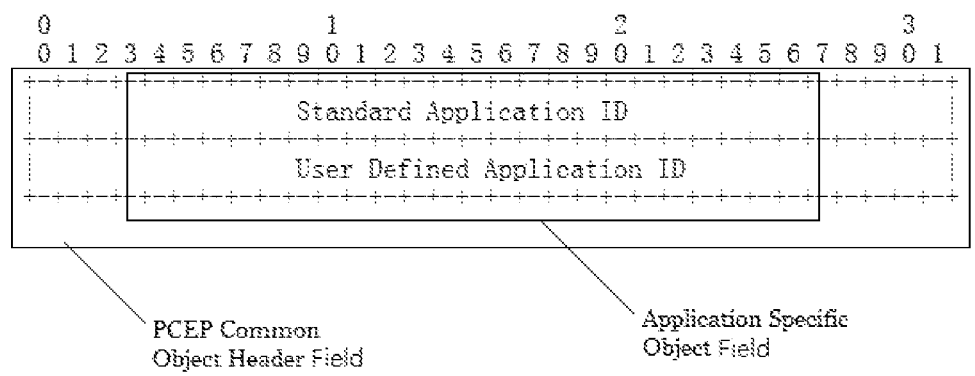
FIG. 7 is a diagram of a package structure of a PCReq message according to another embodiment of the present disclosure.

FIG. 7 is a diagram of a package structure of a PCReq message provided in another embodiment of the present disclosure.

In a case where link parameters of multiple applications are provided in a physical network, as shown in FIG. 3, all nodes, including S, P1, P2, D, and all links, including link1, link2, link3, and link4, in the network join level2 of ISIS instance 1, while application parameters are further configured at each node and link. Taking TE Default Metric parameter of each link as an example, Application 0 (i.e., application RSVP-TE) may set the TE Default Metric of each link to 10, Application 1 (i.e., application SR-TE) may set the TE Default Metric of each link to 20, Application 2 (i.e., application Loop Free Alternate) may set the TE Default Metric of each link to 30, Application 4 (i.e., application Flex Algorithm) may set the TE Default Metric of each link to 40, and each node and each link in the network join level2 of ISIS instance 1.

When the configuration is completed, the controller to which the PCE belongs collects the corresponding network topology information through the BGP-LS. At this time, the controller may collect a link-state database generated by the protocol ISIS level2 with an instance number 1, and the application parameters corresponding to multiple applications contained in the link-state database, that is, the application RSVP-TE using TE Default Metric 10, the application SR-TE using TE Default Metric 20, the application Loop Free Alternate using TE Default Metric 30, and the application Flex Algorithm using TE Default Metric 40.

According to an embodiment of the present disclosure, the PCC at the node S sends the PCReq message to the PCE to request the path computation. The PCReq message carries the constraint condition ID characterizing the above application information. The constraint condition ID is an application ID that is configured to identify the joined Application Specific Object. It should be noted that since the above applications all belong to applications in the link-state database generated by ISIS level2 with the instance number 1, while the above application information is identified by the constraint condition ID, the link-state database of the protocol ISIS level2 with the instance number 1 also need to be further identified. Generally, the identification may be implemented by adding an additional Protocol ID and Identifier in the PCReq message, so as to instruct the PCE to perform the path computation according to the above applications and corresponding application parameters thereof contained in the link-state database of ISIS level2 with the instance number 1, or by not specifying the Protocol ID and the Identifier in the PCReq message, but selecting the specified link-state database for computation by the controller according to a local policy. When the above Protocol ID and Identifier need to be carried in the PCReq message, the method for adding the Protocol ID and the Identifier corresponds to the content described with reference to FIG. 4, which is not repeated here.

As shown in FIG. 7, a new Application Specific Object field is added to the PCEP Common Object Header field of the PCReq message. Depending on the corresponding different application types, the Application Specific Object field may further include a standard application ID and a user defined application ID (or non-standard application ID). Values of the standard application ID follow distribution of application IDs according to draft-ietf-isis-te-app-06, that is, the values represents bit positions of respective applications described by SABM in the draft, and follow subsequent extension of the draft, while the user defined application ID is customized by a user.

According to the standard application ID and the user defined application ID, it can indicate application parameters corresponding to which application in the specified link-state database the TE path computation is based on. According to an embodiment of the present disclosure, during a field setting process, when the standard application ID in Application Specific Object is set to 0, the PCE needs to take the corresponding parameter TE Default Metric 10 corresponding to the application RSVP-TE as one of the consideration factors in the TE path computation; when the standard application ID in Application Specific Object is set to 1, the PCE needs to take the corresponding parameter TE Default Metric 20 corresponding to the application SR-TE as one of the consideration factors in the TE path computation; when the standard application ID in Application Specific Object is set to 2, the PCE needs to take the corresponding parameter TE Default Metric 30 corresponding to the application Loop Free Alternate as one of the consideration factors in the TE path computation; and when the standard application ID in Application Specific Object is set to 3, the PCE needs to take the corresponding parameter TE Default Metric 40 corresponding to the application Flex Algorithm as one of the consideration factors in the TE path computation.

After receiving the PCReq message, the PCE may acquire the standard application ID or user defined application ID field in the PCReq message, thereby performing the TE path computation according to the indication of the field, i.e., the corresponding application, carrying the computed TE path in the PCRep message, returning the PCRep message to the PCC. It should be noted that in this embodiment, the application objects configured by link1, link2, link3, and link4 are already recorded in the link-state database, and the PCE may clarify the correspondence relation between the links and the applications according to the record in the link-state database.

According to an embodiment of the present disclosure, in addition to specifying the objects of the application parameters, the constraint condition may further include other necessary contents, such as a source node and a destination node (in this specific embodiment, for example, the source node S, and the destination node D), bandwidth, time delay, Metric, affinity, and so on.

In a case where the PCReq message does not carry the above application IDs, that is, the constraint condition does not limit the specified application object, the TE path computation is performed based on the application parameters of a default application (which is typically application RSVP-TE).

Figure 8:
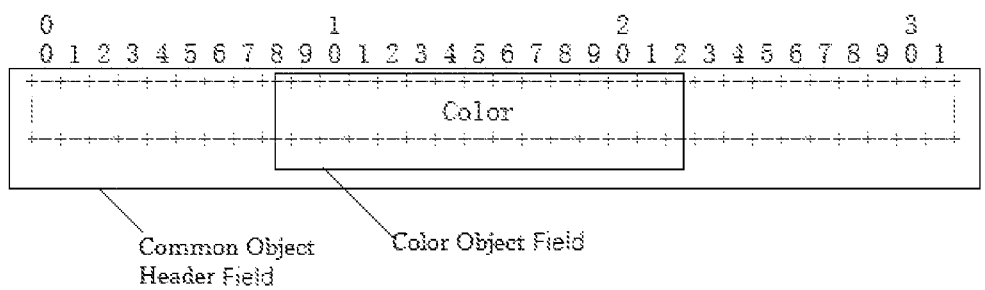
FIG. 8 is a diagram of a package structure of a PCReq message according to another embodiment of the present disclosure.

FIG. 8 is a diagram of a package structure of a PCReq message according to another embodiment of the present disclosure.

In a case that the path computation is performed through a TE target ID, as shown in FIG. 3, all nodes, including S, P1, P2, D, and all links, including link1, link2, link3, and link4, in the network join level2 of ISIS instance 1, where link1 and link2 join MT5 and AII1, and link3 and link4 join MT6 and AII2. That is, in this embodiment, the links are configured with the constraint conditions described above with reference to FIGS. 6 and 7, and the configuration procedure of the relevant constraint conditions corresponds to that described in the foregoing specific embodiments, which is not repeated here.

In this embodiment, before configuring the constraint condition, a TE target configuration operation is performed. According to an embodiment of the present disclosure, the control device aggregates one or more constraint conditions, such as traditional constraint condition bandwidth, time delay, Metric, and affinity, and the constraint condition protocol ID, multi-topology ID, network slice ID, application ID, and the like described above with reference to FIGS. 4 to 7, to acquire a TE target configuration A. The TE target configuration A indicates a set of the above constraint conditions, and has a corresponding TE target ID A.

After acquiring the TE target ID, the control device may deliver TE target information including the TE target configuration A, the TE target ID A and the correspondence relation between the TE target configuration A and the TE target ID A to the PCC and the PCE, so that the PCC and the PCE understand the TE target configuration A and the TE target ID A in the same manner.

After the configuration is completed, the controller to which the PCE belongs collects the corresponding network topology information through the BGP-LS. At this time, the controller may collect a link-state database generated by the protocol ISIS level2 with an instance number 1, two sub-topologies MT5 and MT6 contained in the link-state database, two network slices AII1 and AII2 contained in the link-state database, and the like.

According to an embodiment of the present disclosure, the PCC at the node S sends the PCReq message to the PCE to request the path computation. The PCReq message carries the TE target ID A characterizing the above TE target configuration A. The TE target ID A is carried in the PCReq message as the TE target ID, so that the PCReq message carries the constraint condition ID.

As shown in FIG. 8, a new TE target object (Color Object) field is added to a Common Object Header field of a message sent from the control device to the PCE. The Color Object field includes a Color field that is configured to indicate the TE target ID. That is, the set of constraint conditions in TE target configuration corresponding to the TE target ID is used in the TE path computation. According to an embodiment of the present disclosure, the Color field may be set to 1000, i.e., indicating the TE target IDA.

After receiving the message, the PCE may acquire the Color field in the message. Since the PCC and PCE understand the TE target ID A in the same manner, the PCE may restore the multiple constraint conditions contained in the TE target configuration corresponding to the TE target ID A according to the indication of 1000 of the Color, perform the TE path computation according to the multiple restored constraint conditions, carry the computed TE path in the PCRep message, return the PCRep message to the PCC.

Through the description of the above implementations, those having ordinary skill in the art can clearly understand that the method according to the above embodiments may be implemented by means of software with a necessary general hardware platform, and obviously, it may also be implemented by hardware, but in most cases, the former manner is preferable. Based on such understanding, a part of the technical solutions of the present disclosure essentially making a contribution, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods according to the various embodiments of the present disclosure.

Figure 9:
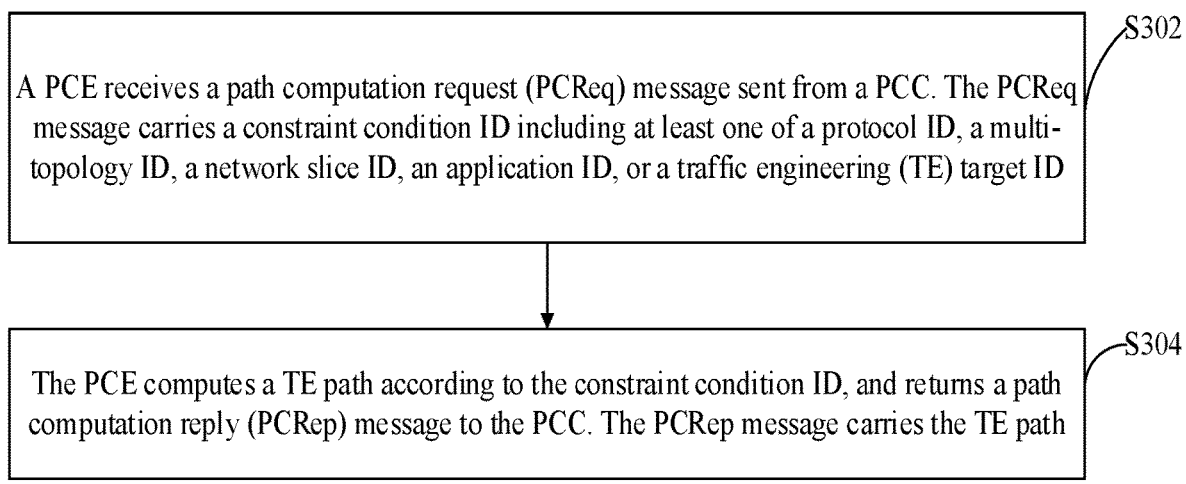
FIG. 9 is a flowchart diagram of a path computation method according to another embodiment of the present disclosure.

FIG. 9 is a flowchart of a path computation method according to another embodiment of the present disclosure. As shown in FIG. 9, the path computation method includes operations S302 and S304.

At operation S302, a PCE receives a path computation request (PCReq) message sent from a PCC. The PCReq message carries a constraint condition ID including at least one of a protocol ID, a multi-topology ID, a network slice ID, an application ID, or a traffic engineering (TE) target ID.

At operation S304, the PCE computes a TE path according to the constraint condition ID, and returns a path computation reply (PCRep) message to the PCC. The PCRep message carries the TE path.

Through the path computation method of the embodiment, the PCC can send a PCReq message to the PCE, the PCReq message carrying a constraint condition ID including at least one of the protocol ID, the multi-topology ID, the network slice ID, the application ID, or the TE target ID, and the PCE can compute the TE path according the constraint condition ID carried in the received PCReq message and return the PCRep message to the PCC, the PCRep message carrying the TE path. Therefore, the path computation method provided in this embodiment can solve a technical problem that an existing path computation method cannot meet current service requirements, and achieve an effect of expanding the service requirements to which the path computation is applicable.

According to an embodiment of the present disclosure, before the operation S302, the method may further include a configuration process on the constraint condition. According to an embodiment of the present disclosure, the configuration process may include delivering configuration information through a control device, or performing local configuration using a CLI. Generally, the control device may consist of a controller or a network management device.

The delivering of the configuration information through the control device includes configuring the constraint condition by the control device according to the service requirements, and sending the constraint condition ID corresponding to the constraint condition in the configured constraint condition to the PCC, or sending the configured constraint condition as well as the constraint condition ID corresponding to the constraint condition to the PCC, so that the PCC sends the PCReq message carrying the constraint condition ID to the PCE for the path computation. For example, when the service requirement requires using a specified protocol as a consideration factor of the path computation, the control device acquires an ID of the specific protocol, and sends the protocol ID to the PCC so that the PCC carries the protocol ID in the PCReq message for sending.

The configuration process on the constraint condition may also adopt a CLI local configuration. In this configuration manner, the control device does not need to participate in the configuration process of the constraint condition. Instead, the node where the PCC is located directly completes the configuration process of the constraint condition and acquisition and transmission of the constraint condition ID through the CLI according to the service requirement. The specific manner of the configuration adopted is not limited in the present application.

The controller to which the PCE belongs may acquire network topology information through a North-Bound Distribution of Link-State and Traffic Engineering (TE) Information Using BGP (BGP-LS) protocol. The network topology information may include various objects, such as a link-state database corresponding to a plurality of different source protocols and protocol instances, a plurality of sub-topologies partitioned by an Interior Gateway Protocol (IGP) and a Multi-Topology Routing (MTR), a plurality of network slices partitioned by an Administrative Instance Identifier (AII), a plurality of different applications and their corresponding TE parameters, and so on.

According to an embodiment of the present disclosure, the PCE may perform the TE path computation according to the constraint condition ID carried in the PCReq message sent from the PCC. That is, the PCE may select a path matching the constraint condition corresponding to the constraint condition ID in the network topology information.

According to an embodiment of the present disclosure, the process of carrying the constraint condition ID in the PCReq message sent from the PCC to the PCE may be implemented by adding a field representing the constraint condition ID to an object field in a format of the PCReq message, so that the constraint condition ID is carried in the PCReq message.

According to an embodiment of the present disclosure, after receiving the PCReq message, the PCE can read the field corresponding to the constraint condition ID in the object field of the PCReq message to acquire the constraint condition ID, and thus know that the object indicated by the constraint condition ID should be considered as one of the factors of the path computation. It should be noted that there are various manners for adding the field representing the constraint condition ID to the object field in the format of the PCReq message, such as adding the field representing the constraint condition ID to a common object header, and field manners are listed below by way of specific embodiments. It will be appreciated that any method that enables the constraint condition ID to be carried in the PCReq message falls within the scope of the present disclosure, which is not limited herein.

In the constraint condition ID carried in the PCReq message according to this embodiment, the protocol ID is configured to indicate a link-state database corresponding to a specified protocol, the multi-topology ID is configured to indicate a specified topology in the link-state database, the network slice ID is configured to indicate a specified network slice in the link-state database, the application ID is configured to indicate a specified application parameter in the link-state database, and the TE target ID is configured to indicate a TE target with a definite meaning.

According to an embodiment of the present disclosure, the TE target with the definite meaning means that a set of constraint conditions is defined by one TE target. For example, the constraint conditions commonly seen in the path computation, such as bandwidth, delay, Metric, affinity, etc., are aggregated and positioned as one TE target to be used in subsequent path computation.

According to an embodiment of the present disclosure, the protocol ID may include at least one of: a source protocol type ID or a protocol instance number ID. When the PCReq message carries the protocol ID, the protocol ID may be configured to indicate the link-state database corresponding to which source protocol and/or protocol instance number is used as a the constraint condition to perform the TE path computation.

When the PCReq message carries the multi-topology ID, the multi-topology ID may be configured to indicate which sub-topology in the specified link-state database is used for the TE path computation.

When the PCReq message carries the network slice ID, the network slice ID may be configured to indicate which network slice in the specified link-state database is used for the TE path computation.

According to an embodiment of the present disclosure, when the PCReq message carries the application ID, the application ID may be configured to indicate parameters corresponding to which application in the specified link-state database are used for the TE path computation. Depending on different types of applications, the application ID may generally include: a standard application ID and a user defined (or non-standard) application ID.

According to an embodiment of the present disclosure, when the constraint condition ID includes the TE target ID, before the operation S302, the method further includes acquiring TE target information. The TE target information is sent from the control device to the PCC and the PCE, and carries a TE target ID, TE target configuration and a correspondence relation between the TE target ID and the TE target configuration. The TE target configuration is configured to indicate a set of pre-configured constraint conditions.

According to an embodiment of the present disclosure, before the TE target ID is carried in the PCReq message, the TE target needs to be further configured. According to an embodiment of the present disclosure, the TE target information may be sent to the PCC and the PCE by the control device, respectively. The TE target information includes the TE target ID, TE target configuration and a correspondence relation between the TE target ID and the TE target configuration. The TE target configuration refers to a set of pre-configured constraint conditions. After the control device delivers the TE target configuration and the TE target ID together with the correspondence relation between the TE target ID and the TE target configuration to both the PCC and the PCE, the PCC can directly indicate the set of the pre-configured constraint conditions through the TE target ID during interaction with the PCE without carrying a plurality of constraint conditions in the PCReq message. Meanwhile, the PCE can also directly acquire the constraint condition to be considered according to the TE target, or even directly acquire the corresponding TE path when the constraint condition in the PCReq message contains only the TE target, thereby effectively reducing computation operations during the TE path computation.

According to an embodiment of the present disclosure, in the above operation S304, in a case where the PCE fails to compute the TE path according to the constraint condition ID, the PCRep message further carries a cause for the failure of the TE path computation.

According to an embodiment of the present disclosure, in this case, the PCRep message returned from the PCE to the PCC may further carry a cause for the failure of the TE path computation, so that the PCC or the control device can adjust the constraint condition in time.

Through the description of the above implementations, those having ordinary skill in the art can clearly understand that the method according to the above embodiment may be implemented by means of software with a necessary general hardware platform, and obviously, it may also be implemented by hardware, but in most cases, the former manner is preferable. Based on such understanding, a part of the technical solutions of the present disclosure essentially making a contribution, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods of the various embodiments of the present disclosure.

Figure 10:
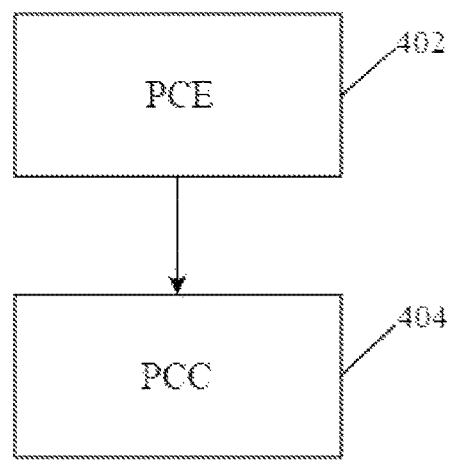
FIG. 10 is a diagram of functional modules in a path computation system according to another embodiment of the present disclosure.

FIG. 10 is a diagram of functional modules in a path computation system according to another embodiment of the present disclosure. As shown in FIG. 10, the path computation system includes a PCE 402 and a PCC 404.

The PCE 402 is configured to acquire a preset constraint condition ID, and compute a TE path according to the constraint condition ID, and the constraint condition ID including at least one of a protocol ID, a multi-topology ID, a network slice ID, an application ID, or a TE target ID.

The PCE 402 is further configured to send a path computation initiation (PCEP Initiate, PCInitiate) message or a path computation update (PCEP Update, PCUpd) message to the PCC 404. The PCInitiate or PCUpd message carries a TE path. The PCC 404 is configured to receive the PCInitiate or PCUpd message.

Through the path computation system of the embodiment, the PCE can acquire the preset constraint condition ID and compute the TE path according to the constraint condition ID, the constraint condition ID including at least one of the protocol ID, the multi-topology ID, the network slice ID, the application ID, or the TE target ID, and can send the PCInitiate or PCUpd message to the PCC, the PCInitiate or PCUpd message carries the TE path, and the PCC can receive the PCInitiate or PCUpd message, Therefore, the path computation system provided in this embodiment can solve a technical problem that an existing path computation method cannot meet current service requirements, and achieve an effect of expanding the service requirements to which the path computation is applicable.

According to an embodiment of the present disclosure, the PCE in the path computation system may perform the path computation according to the constraint condition in a case where the PCC has an explicit object (such as a protocol, a topology, a network slice, and the like), so that applicable scenarios of the TE path computation performed by the PCE is increased, and the PCE is more adapted to path requirements formed from the service requirements of the PCC in different scenarios.

According to an embodiment of the present disclosure, the PCInitiate message is a message delivered by the PCE to the PCC to initiate the TE path when the PCC does not obtain the TE path, and the PCUpd message is a message delivered to the PCC when the PCC has the TE path, via which an updated TE path may be delivered to the PCC.

According to an embodiment of the present disclosure, the PCE acquires the preset constraint condition ID in such a way that the PCE acquires a pre-configured constraint condition. The constraint condition may be configured by a network management device, or by CLI local configuration at the PCE.

Configuring the constraint condition for the PCE by a control device means instructing the control device to configure the constraint condition according to the service requirements, and deliver a corresponding constraint condition ID in the configured constraint condition to the PCE, so that the PCE performs the TE path computation according to the constraint condition ID, directly carries the TE path in the PCInitiate or PCUpd message which is to be actively delivered to the PCC. For example, when the service requirements require using a specified protocol as a consideration factor of the path computation, the control device acquires an ID of the specific protocol, and sends the protocol ID to the PCE so that the PCE performs the TE path computation according to the protocol ID, and carries the computed TE path in the PCInitiate or PCUpd message which is to be actively delivered to the PCC.

The configuration process on the constraint condition may also adopt a CLI local configuration at the PCE. In this configuration manner, the control device does not need to participate in the configuration process of the constraint condition. Instead, the configuration of the constraint condition is directly completed by the PCE according to the service requirements through the CLI, and the specific manner of the configuration process adopted is not limited in the present application.

The controller to which the PCE belongs may acquire network topology information through a North-Bound Distribution of Link-State and Traffic Engineering (TE) Information Using BGP (BGP-LS) protocol. The network topology information may include various objects, such as a link-state database corresponding to a plurality of different source protocols and protocol instances, a plurality of sub-topologies partitioned by an Interior Gateway Protocol (IGP) and a Multi-Topology Routing (MTR), a plurality of network slices partitioned by an Administrative Instance Identifier (AII), a plurality of different applications and their corresponding TE parameters, and so on.

According to an embodiment of the present disclosure, the PCE can perform the TE path computation according to the constraint condition ID. That is, the PCE may select a path matching the constraint condition corresponding to the constraint condition ID in the network topology information.

In the constraint condition ID according to the embodiment of the present disclosure, the protocol ID is configured to indicate a link-state database corresponding to a specified protocol, the multi-topology ID is configured to indicate a specified topology in the link-state database, the network slice ID is configured to indicate a specified network slice in the link-state database, the application ID is configured to indicate a specified application parameter in the link-state database, and the TE target ID is configured to indicate a TE target with a definite meaning.

According to an embodiment of the present disclosure, the TE target with the definite meaning means that a set of constraint conditions is defined by one TE target. For example, the constraint conditions commonly seen in the path computation, such as bandwidth, delay, Metric, affinity, etc., are aggregated and positioned as one TE target to be used in subsequent path computation.

According to an embodiment of the present disclosure, the protocol ID may include at least one of a source protocol type ID or a protocol instance number ID. When the constraint condition ID includes the protocol ID, the protocol ID may be configured to indicate the link-state database corresponding to which source protocol and/or protocol instance number is used as the constraint condition to perform the TE path computation.

When the constraint condition ID includes the multi-topology ID, the multi-topology ID may be configured to indicate which sub-topology in the specified link-state database is used for the TE path computation.

When the constraint condition ID includes the network slice ID, the network slice ID may be configured to indicate which network slice in the specified link-state database is used for the TE path computation.

According to an embodiment of the present disclosure, When the constraint condition ID includes the application ID, the application ID may be configured to indicate parameters corresponding to which application in the specified link-state database are used for the TE path computation. Depending on different types of applications, the application ID may generally include a standard application ID and/or a user defined (or non-standard) application ID.

When the constraint condition ID identifies the TE target ID, the TE target ID may be configured to indicate replacing a set of other constraint conditions with the TE target with the definite meaning, and then the PCE may directly perform the TE path computation according to the TE target indicated by the TE target ID.

According to an embodiment of the present disclosure, when the constraint condition ID includes the TE target ID, the PCE is further configured to acquiring TE target information. The TE target information is sent from the control device to the PCE, and carries the TE target ID, TE target configuration and a correspondence relation between the TE target ID and the TE target configuration. The TE target configuration is configured to indicate a set of preset constraint conditions.

According to an embodiment of the present disclosure, when the TE target ID is used as the constraint condition ID, the TE target needs to be further configured. According to an embodiment of the present disclosure, the TE target information may be sent to the PCE and the PCC by the control device, respectively. The TE target information includes the TE target ID, the TE target configuration and the correspondence relation between the TE target ID and the TE target configuration. The TE target configuration refers to the set of the pre-configured constraint conditions. After the control device delivers the TE target configuration and the TE target ID together with the correspondence relation between the TE target ID and the TE target configuration to the PCE and the PCC, the PCE can directly indicate the set of the pre-configured constraint conditions through the TE target ID during interaction with the PCC without specifying a plurality of constraint conditions in the constraint conditions as the objects. Meanwhile, the PCE can also directly acquire the corresponding TE path according to the TE target, thereby effectively reducing computation operations during the TE path computation process.

Figure 11:
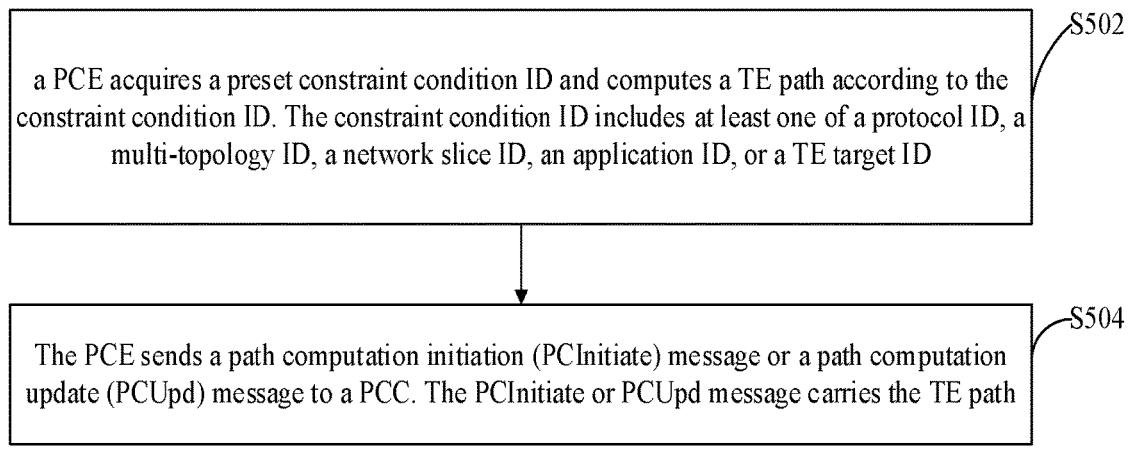
FIG. 11 is a flowchart diagram of a path computation method according to another embodiment of the present disclosure.

FIG. 11 is a flowchart of a path computation method according to another embodiment of the present disclosure. As shown in FIG. 11, the path computation method includes operations S502 and S504.

At operation S502, a PCE acquires a preset constraint condition ID and computes a TE path according to the constraint condition ID. The constraint condition ID includes at least one of a protocol ID, a multi-topology ID, a network slice ID, an application ID, or a TE target ID.

At operation S504, the PCE sends a path computation initiation (PCInitiate) message or a path computation update (PCUpd) message to a PCC. The PCInitiate or PCUpd message carries the TE path.

Through the path computation method of the embodiment, the PCE can acquire the preset constraint condition ID and compute the TE path according to the constraint condition ID, the constraint condition ID including at least one of the protocol ID, the multi-topology ID, the network slice ID, the application ID, or the TE target ID, and can send the PCInitiate or PCUpd message to the PCC, the PCInitiate or PCUpd message carries the TE path, and the PCC can receive the PCInitiate or PCUpd message, Therefore, the path computation method provided in this embodiment can solve a technical problem that an existing path computation method cannot meet current service requirements, and achieve an effect of expanding the service requirements to which the path computation is applicable.

According to an embodiment of the present disclosure, the PCE in the path computation method may perform the path computation according to the constraint condition in a case where the PCC has an explicit object (such as a protocol, a topology, a network slice, and the like), so that applicable scenarios of the TE path computation performed by the PCE is increased, and the PCE is more adapted to path requirements formed from the service requirements of the PCC in different scenarios.

According to an embodiment of the present disclosure, the PCInitiate message is a message delivered by the PCE to the PCC to initiate the TE path when the PCC does not obtain a TE path, and the PCUpd message is a message delivered to the PCC when the PCC has the TE path, via which an updated TE path may be delivered to the PCC.

According to an embodiment of the present disclosure, before the operation S502, the method further includes a configuration process on the constraint condition. The PCE acquires the preset constraint condition ID in such a way that the PCE acquires a pre-configured constraint condition. The constraint condition may be configured by a network management device, or by a CLI local configuration at the PCE.

Configuring the constraint condition for the PCE by a control device means instructing the control device to configure the constraint condition according to the service requirements, and deliver a corresponding constraint condition ID in the configured constraint condition to the PCE, so that the PCE performs the TE path computation according to the constraint condition ID, directly carries the TE path in the PCInitiate or PCUpd message which is to be actively delivered to the PCC. For example, when the service requirements require using a specified protocol as a consideration factor of the path computation, the control device acquires an ID of the specific protocol, and sends the protocol ID to the PCE so that the PCE performs the TE path computation according to the protocol ID, and carries the computed TE path in the PCInitiate or PCUpd message which is to be actively delivered to the PCC.

The configuration process on the constraint condition may also adopt the CLI local configuration at the PCE. In this configuration manner, the control device does not need to participate in the configuration process of the constraint condition. Instead, the configuration of the constraint condition is directly completed by the PCE according to the service requirements through the CLI, and the specific manner of the configuration process adopted is not limited in the present application.

The controller to which the PCE belongs may acquire network topology information through a North-Bound Distribution of Link-State and Traffic Engineering (TE) Information Using BGP (BGP-LS) protocol. The network topology information may include various objects, such as a link-state database corresponding to a plurality of different source protocols and protocol instances, a plurality of sub-topologies partitioned by an Interior Gateway Protocol (IGP) and a Multi-Topology Routing (MTR), a plurality of network slices partitioned by an Administrative Instance Identifier (AII), a plurality of different applications and their corresponding TE parameters, and so on.

According to an embodiment of the present disclosure, the PCE can perform the TE path computation according to the constraint condition ID. That is, the PCE may select a path matching the constraint condition corresponding to the constraint condition ID in the network topology information.

In the constraint condition ID according to the embodiment of the present disclosure, the protocol ID is configured to indicate a link-state database corresponding to a specified protocol, the multi-topology ID is configured to indicate a specified topology in the link-state database, the network slice ID is configured to indicate a specified network slice in the link-state database, the application ID is configured to indicate a specified application parameter in the link-state database, and the TE target ID is configured to indicate a TE target with a definite meaning.

According to an embodiment of the present disclosure, the TE target with the definite meaning means that a set of constraint conditions is defined by one TE target. For example, the constraint conditions commonly seen in the path computation, such as bandwidth, delay, Metric, affinity, etc., are aggregated and positioned as one TE target to be used in subsequent path computation.

According to an embodiment of the present disclosure, the protocol ID may include at least one of: a source protocol type ID or a protocol instance number ID. When the constraint condition ID includes the protocol ID, the protocol ID may be configured to indicate the link-state database corresponding to which source protocol and/or protocol instance number is used as the constraint condition to perform the TE path computation.

When the constraint condition ID includes the multi-topology ID, the multi-topology ID may be configured to indicate which sub-topology in the specified link-state database is used for the TE path computation.

When the constraint condition ID includes the network slice ID, the network slice ID may be configured to indicate which network slice in the specified link-state database is used for the TE path computation.

According to an embodiment of the present disclosure, when the constraint condition ID includes the application ID, the application ID may be configured to indicate parameters corresponding to which application in the specified link-state database are used for the TE path computation. Depending on different types of applications, the application ID may generally include a standard application ID and/or a user defined (or non-standard) application ID.

When the constraint condition ID identifies the TE target ID, the TE target ID may be configured to indicate replacing a set of other constraint conditions with the TE target with the definite meaning, and then the PCE may directly perform the TE path computation according to the TE target indicated by the TE target ID.

According to an embodiment of the present disclosure, when the constraint condition ID includes the TE target ID, before the operation S502, the method further includes: acquiring, by the PCE, TE target information. The TE target information is sent from the control device to the PCE, and carries the TE target ID, TE target configuration and a correspondence relation between the TE target ID and the TE target configuration. The TE target configuration is configured to indicate a set of preset constraint conditions.

According to an embodiment of the present disclosure, when the TE target ID is used as the constraint condition ID, the TE target needs to be further configured. According to an embodiment of the present disclosure, the TE target information may be sent to the PCE and the PCC by the control device, respectively. The TE target information includes the TE target ID, the TE target configuration and the correspondence relation between the TE target ID and the TE target configuration. The TE target configuration refers to the set of the pre-configured constraint conditions. After the control device delivers the TE target configuration and the TE target ID together with the correspondence relation between the TE target ID and the TE target configuration to the PCE and the PCC, the PCE can directly indicate the set of the pre-configured constraint conditions through the TE target ID during interaction with the PCC without specifying a plurality of constraint conditions in the constraint conditions as the objects. Meanwhile, the PCE can also directly acquire the corresponding TE path according to the TE target, thereby effectively reducing computation operations during the TE path computation process.

Through the description of the above implementations, it should be clearly understood by those having ordinary skill in the art that the method according to the above embodiment may be implemented by means of software and essential universal hardware platform, and obviously, it may also be implemented by hardware, but in most cases, the former manner is preferable. Based on such understanding, the technical solutions of the present disclosure essentially or, in other words, a part thereof contributing to the existing technology, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods of the various embodiments of the present disclosure.

Figure 12:
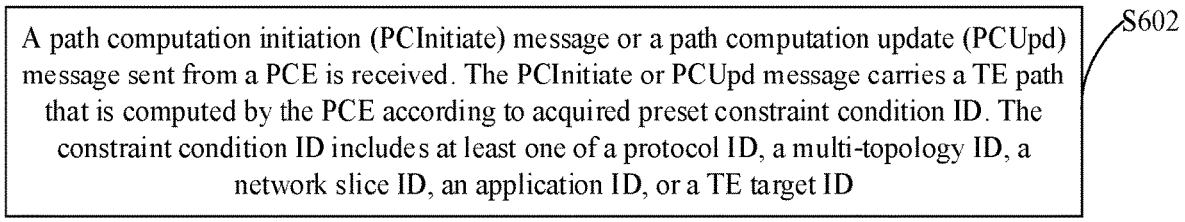
FIG. 12 is a flowchart diagram of a path computation method according to another embodiment of the present disclosure.

FIG. 12 is a flowchart of a path computation method according to another embodiment of the present disclosure. As shown in FIG. 12, the path computation method includes a operation S602.

At the operation S602, a path computation initiation (PCInitiate) message or a path computation update (PCUpd) message sent from a PCE is received. The PCInitiate or PCUpd message carries a TE path that is computed by the PCE according to acquired preset constraint condition ID. The constraint condition ID includes at least one of a protocol ID, a multi-topology ID, a network slice ID, an application ID, or a TE target ID.

Through the path computation method of the embodiment, the PCE can acquire the preset constraint condition ID and compute the TE path according to the constraint condition ID, and the constraint condition ID including at least one of the protocol ID, the multi-topology ID, the network slice ID, the application ID, or the TE target ID, and can send the PCInitiate or PCUpd message to a PCC, the PCInitiate or PCUpd message carries the TE path, and the PCC can receive the PCInitiate or PCUpd message, Therefore, the path computation method provided in this embodiment can solve a technical problem that an existing path computation method cannot meet current service requirements, and achieve an effect of expanding the service requirements to which the path computation is applicable.

According to an embodiment of the present disclosure, before the operation S602, the method further includes a configuration process on the constraint condition. The PCE acquires the preset constraint condition ID in such a way that the PCE acquires a pre-configured constraint condition. The constraint condition may be configured by a network management device, or by a CLI local configuration at the PCE.

Configuring the constraint condition for the PCE by a control device means instructing the control device to configure the constraint condition according to the service requirements, and deliver a corresponding constraint condition ID in the configured constraint condition to the PCE, so that the PCE performs the TE path computation according to the constraint condition ID, directly carries the TE path in the PCInitiate or PCUpd message which is to be actively delivered to the PCC. For example, when the service requirements require using a specified protocol as a consideration factor of the path computation, the control device acquires an ID of the specific protocol, and sends the protocol ID to the PCE so that the PCE performs the TE path computation according to the protocol ID, and carries the computed TE path in the PCInitiate or PCUpd message which is to be actively delivered to the PCC.

The configuration process on the constraint condition may also adopt the CLI local configuration at the PCE. In this configuration manner, the control device does not need to participate in the configuration process of the constraint condition. Instead, the configuration of the constraint condition is directly completed by the PCE according to the service requirements through the CLI, and the specific manner of the configuration process adopted is not limited in the present application.

The controller to which the PCE belongs may acquire network topology information through a North-Bound Distribution of Link-State and Traffic Engineering (TE) Information Using BGP (BGP-LS) protocol. The network topology information may include various objects, such as a link-state database corresponding to a plurality of different source protocols and protocol instances, a plurality of sub-topologies partitioned by an Interior Gateway Protocol (IGP) and a Multi-Topology Routing (MTR), a plurality of network slices partitioned by an Administrative Instance Identifier (AII), a plurality of different applications and their corresponding TE parameters, and so on.

According to an embodiment of the present disclosure, the PCE can perform the TE path computation according to the constraint condition ID. That is, the PCE may select a path matching the constraint condition corresponding to the constraint condition ID in the network topology information.

In the constraint condition ID according to the embodiment of the present disclosure, the protocol ID is configured to indicate a link-state database corresponding to a specified protocol, the multi-topology ID is configured to indicate a specified topology in the link-state database, the network slice ID is configured to indicate a specified network slice in the link-state database, the application ID is configured to indicate a specified application parameter in the link-state database, and the TE target ID is configured to indicate a TE target with a definite meaning.

According to an embodiment of the present disclosure, the TE target with the definite meaning means that a set of constraint conditions is defined by one TE target. For example, the constraint conditions commonly seen in the path computation, such as bandwidth, delay, Metric, affinity, etc., are aggregated and positioned as one TE target to be used in subsequent path computation.

According to an embodiment of the present disclosure, the protocol ID may include at least one of: a source protocol type ID or a protocol instance number ID. When the constraint condition ID includes the protocol ID, the protocol ID may be configured to indicate the link-state database corresponding to which source protocol and/or protocol instance number is used as the constraint condition to perform the TE path computation.

When the constraint condition ID includes the multi-topology ID, the multi-topology ID may be configured to indicate which sub-topology in the specified link-state database is used for the TE path computation.

When the constraint condition ID includes the network slice ID, the network slice ID may be configured to indicate which network slice in the specified link-state database is used for the TE path computation.

According to an embodiment of the present disclosure, When the constraint condition ID includes the application ID, the application ID may be configured to indicate parameters corresponding to which application in the specified link-state database are used for the TE path computation. Depending on different types of applications, the application ID may generally include a standard application ID and/or a user defined (or non-standard) application ID.

When the constraint condition ID identifies the TE target ID, the TE target ID may be configured to indicate replacing a set of other constraint conditions with the TE target with the definite meaning, and then the PCE may directly perform the TE path computation according to the TE target indicated by the TE target ID.

According to an embodiment of the present disclosure, when the constraint condition ID includes the TE target ID, before the operation S602, the method further includes: acquiring, by the PCE, TE target information. The TE target information is sent from the control device to the PCE, and carries the TE target ID, TE target configuration and a correspondence relation between the TE target ID and the TE target configuration. The TE target configuration is configured to indicate a set of preset constraint conditions. According to an embodiment of the present disclosure, when the TE target ID is used as the constraint condition ID, the TE target needs to be further configured. According to an embodiment of the present disclosure, the TE target information may be sent to the PCE and the PCC by the control device, respectively. The TE target information includes the TE target ID, the TE target configuration and the correspondence relation between the TE target ID and the TE target configuration. The TE target configuration refers to the set of the pre-configured constraint conditions. After the control device delivers the TE target configuration and the TE target ID together with the correspondence relation between the TE target ID and the TE target configuration to the PCE and the PCC, the PCE can directly indicate the set of the pre-configured constraint conditions through the TE target ID during interaction with the PCC without specifying a plurality of constraint conditions in the constraint conditions as the objects. Meanwhile, the PCE can also directly acquire the corresponding TE path according to the TE target, thereby effectively reducing computation operations during the TE path computation process.

Through the description of the above implementations, those having ordinary skill in the art can clearly understand that the method according to the above embodiment may be implemented by means of software plus a necessary general hardware platform, and obviously, it may also be implemented by hardware, but in most cases, the former manner is preferable. Based on such understanding, the technical solutions of the present disclosure essentially or, in other words, a part thereof contributing to the existing technology, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods of the various embodiments of the present disclosure.

The present disclosure further provides a path computation apparatus configured to implement the above embodiments and preferable implementations. Details which have been explained will not be repeated here. As used herein, the term "module" may be a combination of software and/or hardware that can realize a preset function. The apparatus described in the following embodiments is preferably implemented in software, but hardware or a combination of software and hardware is also possible and contemplated.

Figure 13:
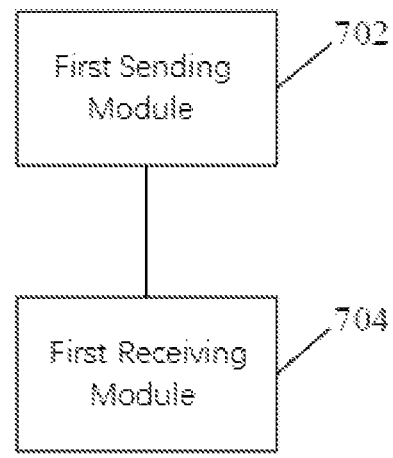
FIG. 13 is a block diagram of a path computation apparatus according to an embodiment of the present disclosure.

FIG. 13 is a block diagram of a path computation apparatus according to an embodiment of the present disclosure. As shown in FIG. 13, the apparatus includes a first sending module 702 and a first receiving module 704.

The first sending module 702 is configured to send a path computation request (PCReq) message to a PCE. The PCReq message carries a constraint condition ID including at least one of a protocol ID, a multi-topology ID, a network slice ID, an application ID, or a TE target ID; and the PCReq message is configured to instruct the PCE to compute a TE path according to the constraint condition ID.

The first receiving module 704 is configured to receive a path computation reply (PCRep) message returned from the PCE. The PCRep message carries the TE path.

The operation manner and beneficial effects of the path computation apparatus according to the embodiment of the present disclosure correspond to those of the path computation method described with reference to FIG. 2, and thus are not repeated here.

According to an embodiment of the present disclosure, the protocol ID includes at least one of a source protocol type ID or a protocol instance number ID.

According to an embodiment of the present disclosure, the application ID includes at least one of a standard application ID or a user defined application ID.

According to an embodiment of the present disclosure, in a case where the constraint condition ID includes the TE target ID, the first sending module 702 is further configured to acquire TE target information. The TE target information is sent from a control device to the PCC and the PCE, and carries the TE target ID, TE target configuration and a correspondence relation between the TE target ID and the TE target configuration. The TE target configuration is configured to indicate a set of preset constraint conditions.

According to an embodiment of the present disclosure, in a case where the PCE fails to compute the TE path according to the constraint condition ID, the PCRep message further carries a cause for the failure of the TE path computation.

According to an embodiment of the present disclosure, the above modules may be implemented by software or hardware. For hardware, the implementing manner includes, but is not limited to, the above modules all located in the same processor; or the above modules are located in different processors in any combination.

Figure 14:
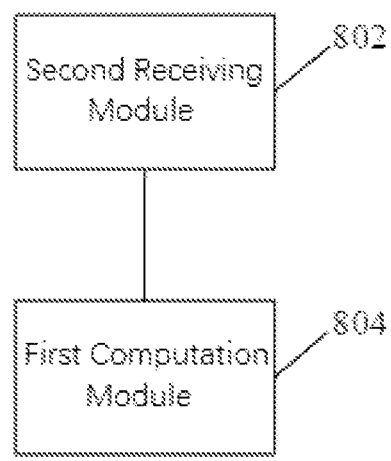
FIG. 14 is a block diagram of a path computation apparatus according to another embodiment of the present disclosure.

FIG. 14 is a block diagram of a path computation apparatus according to another embodiment of the present disclosure. As shown in FIG. 14, the apparatus includes a second receiving module 802 and a first computation module 804.

The second receiving module 802 is configured to receive a path computation request (PCReq) message sent from a PCC. The PCReq message carries a constraint condition ID including at least one of a protocol ID, a multi-topology ID, a network slice ID, an application ID, or a TE target ID.

The first computation module 804 is configured to compute a TE path according to the constraint condition ID, and return a path computation reply (PCRep) message to the PCC. The PCRep message carries the TE path.

The operation manner and beneficial effects of the path computation apparatus according to the embodiment of the present disclosure correspond to the path computation method described with reference to FIG. 9, and therefore are not described herein again.

According to an embodiment of the present disclosure, the protocol ID includes at least one of a source protocol type ID or a protocol instance number ID.

According to an embodiment of the present disclosure, the application ID includes at least one of a standard application ID or a user defined application ID.

According to an embodiment of the present disclosure, in a case where the constraint condition ID includes the TE target ID, the second receiving module 802 is further configured to acquire TE target information. The TE target information is sent from a control device to the PCC and the PCE, and carries the TE target ID, TE target configuration and a correspondence relation between the TE target ID and the TE target configuration. The TE target configuration is configured to indicate a set of preset constraint conditions.

According to an embodiment of the present disclosure, in a case where the PCE fails to compute the TE path according to the constraint condition ID, the PCRep message further carries a cause for the failure of the TE path computation.

According to an embodiment of the present disclosure, the above modules may be implemented by software or hardware. For hardware, the implementing manner includes, but is not limited to, the above modules all located in the same processor; or the above modules are located in different processors in any combination.

Figure 15:
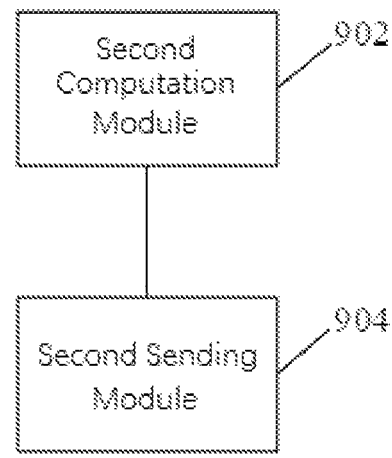
FIG. 15 is a block diagram of a path computation apparatus according to another embodiment of the present disclosure.

FIG. 15 is a block diagram of a path computation apparatus according to another embodiment of the present disclosure. As shown in FIG. 15, the apparatus includes a second computation module 902, and a second sending module 904.

The second computation module 902 is configured to acquire a preset constraint condition ID, and compute a TE path according to the constraint condition ID. The constraint condition ID includes at least one of a protocol ID, a multi-topology ID, a network slice ID, an application ID, or a TE target ID.

The second sending module 904 is configured to send a path computation initiation (PCInitiate) message or a path computation update (PCUpd) message to a PCC. The PCInitiate or PCUpd message carries the TE path.

The operation manner and beneficial effects of the path computation apparatus according to the embodiment of the present disclosure correspond to the path computation method described with reference to FIG. 11, and therefore are not described herein again.

According to an embodiment of the present disclosure, the protocol ID includes at least one of a source protocol type ID or a protocol instance number ID.

According to an embodiment of the present disclosure, the application ID includes at least one of a standard application ID or a user defined application ID.

According to an embodiment of the present disclosure, in a case where the constraint condition ID includes the TE target ID, the second computation module 902 is further configured to acquire TE target information. The TE target information is sent from a control device to the PCE, and contains the TE target ID, TE target configuration and a correspondence relation between the TE target ID and the TE target configuration. The TE target configuration is configured to indicate a set of preset constraint conditions. According to an embodiment of the present disclosure, the above modules may be implemented by software or hardware. For hardware, the implementing manner includes, but is not limited to, the above modules all located in the same processor; or the above modules are located in different processors in any combination.

Figure 16:
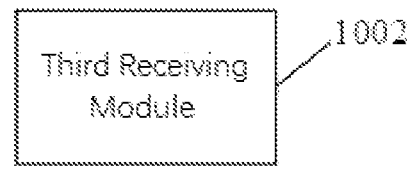
FIG. 16 is a block diagram of a path computation apparatus according to another embodiment of the present disclosure.

FIG. 16 is a block diagram of a path computation apparatus according to another embodiment of the present disclosure. As shown in FIG. 16, the apparatus includes a third receiving module 1002.

The third receiving module 1002 is configured to receive a path computation initiation (PCInitiate) message or a path computation update (PCUpd) message sent from a PCE. The PCInitiate or PCUpd message carries a TE path that is computed by the PCE according to acquired preset constraint condition information. The constraint condition ID including at least one of a protocol ID, a multi-topology ID, a network slice ID, an application ID, or a TE target ID.

The operation manner and beneficial effects of the path computation apparatus according to the embodiment of the present disclosure correspond to the path computation method described with reference to FIG. 12, and therefore are not described herein again.

According to an embodiment of the present disclosure, the protocol ID includes at least one of a source protocol type ID or a protocol instance number ID.

According to an embodiment of the present disclosure, the application ID includes at least one of a standard application ID or a user defined application ID.

According to an embodiment of the present disclosure, when the constraint condition ID includes the TE target ID, the third receiving module 1002 is further configured to acquire TE target information. The TE target information is sent from a control device to the PCE, and contains the TE target ID, TE target configuration and a correspondence relation between the TE target ID and the TE target configuration. The TE target configuration is configured to indicate a set of preset constraint conditions.

According to an embodiment of the present disclosure, the above modules may be implemented by software or hardware. For hardware, the implementing manner includes, but is not limited to, the above modules all located in the same processor; or the above modules each located in different processors in any combination.

The present disclosure further provides a storage medium having a computer program stored thereon. The computer program is configured to, when executed, cause the operations of the path computation method described with reference to FIG. 2 to be implemented.

According to an embodiment of the present disclosure, the above storage medium may be configured to store the computer program for executing the following operations S1 and S2.

At operation S1, a path computation request (PCReq) message is sent to a PCE. The PCReq message carries a constraint condition ID including at least one of a protocol ID, a multi-topology ID, a network slice ID, an application ID, or a traffic engineering (TE) target ID, and the PCReq message is configured to instruct the PCE to compute a TE path according to the constraint condition ID.

At operation S2, a path computation reply (PCRep) message returned from the PCE is received. The PCRep message carries the TE path.

According to an embodiment of the present disclosure, the storage medium may include, but is not limited to, a U disk, a read-only memory (ROM), a random access memory (RAM), a mobile hard disk, a disk or optical disk, and other media that can store a computer program.

The present disclosure further provides a storage medium having a computer program stored thereon. The computer program is configured to, when executed, cause the operations of the path computation method described with reference to FIG. 9 to be implemented.

According to an embodiment of the present disclosure, the above storage medium may be configured to store the computer program for executing the following operations S1 and S2.

At operation S1, a path computation request (PCReq) message sent from a PCC is received. The PCReq message carries a constraint condition ID including at least one of a protocol ID, a multi-topology ID, a network slice ID, an application ID, or a traffic engineering (TE) target ID.

At operation S2, a TE path is computed according to the constraint condition ID, and a path computation reply (PCRep) message is returned to the PCC. The PCRep message carries the TE path.

According to an embodiment of the present disclosure, the storage medium may include, but is not limited to, a U disk, a read-only memory (ROM), a random access memory (RAM), a mobile hard disk, a disk or optical disk, and other media that can store a computer program.

The present disclosure further provides a storage medium having a computer program stored thereon. The computer program is configured to, when executed, cause the operations of the path computation method described with reference to FIG. 11 to be implemented.

According to an embodiment of the present disclosure, the above storage medium may be configured to store the computer program for executing the following operations S1 and S2.

At operation S1, a preset constraint condition ID is acquired, and a TE path is computed according to the constraint condition ID. The constraint condition ID includes at least one of a protocol ID, a multi-topology ID, a network slice ID, an application ID, or a TE target ID.

At operation S2, a path computation initiation (PCInitiate) message or a path computation update (PCUpd) message is sent to a PCC. The PCInitiate or PCUpd message carries the TE path.

According to an embodiment of the present disclosure, the storage medium may include, but is not limited to, a U disk, a read-only memory (ROM), a random access memory (RAM), a mobile hard disk, a disk or optical disk, and other media that can store a computer program.

The present disclosure further provides a storage medium having a computer program stored thereon. The computer program is configured to, when executed, cause the operations of the path computation method described with reference to FIG. 12 to be implemented.

According to an embodiment of the present disclosure, the above storage medium may be configured to store the computer program for executing the following operation S1.

At operation S1, a path computation initiation (PCInitiate) message or a path computation update (PCUpd) message sent from a PCE is received. The PCInitiate or PCUpd message carries a TE path that is computed by the PCE according to acquired preset constraint condition information. The constraint condition ID includes at least one of a protocol ID, a multi-topology ID, a network slice ID, an application ID, or a TE target ID.

According to an embodiment of the present disclosure, the storage medium may include, but is not limited to, a U disk, a read-only memory (ROM), a random access memory (RAM), a mobile hard disk, a disk or optical disk, and other media that can store a computer program.

The present disclosure further provides an electronic apparatus, including a memory and a processor. The memory has a computer program stored thereon, and the processor is configured to execute the computer program to implement the operations of the path computation method described with reference to FIG. 2.

According to an embodiment of the present disclosure, the electronic apparatus may further include a transmission device and an input/output device. The transmission device is coupled to the processor, and the input/output device is coupled to the processor.

According to an embodiment of the present disclosure, the processor may be configured to execute the computer program to implement the following operations S1 and S2.

At operation S1, a path computation request (PCReq) message is sent to a PCE. The PCReq message carries a constraint condition ID including at least one of a protocol ID, a multi-topology ID, a network slice ID, an application ID, or a traffic engineering (TE) target ID, and the PCReq message is configured to instruct the PCE to compute a TE path according to the constraint condition ID.

At operation S2, a path computation reply (PCRep) message returned from the PCE is received. The PCRep message carries the TE path.

The present disclosure further provides an electronic apparatus, including a memory and a processor. The memory has a computer program stored thereon, and the processor is configured to execute the computer program to implement the operations of the path computation method described with reference to FIG. 9.

According to an embodiment of the present disclosure, the electronic apparatus may further include a transmission device and an input/output device. The transmission device is coupled to the processor, and the input/output device is coupled to the processor.

According to an embodiment of the present disclosure, the processor may be configured to execute the computer program to implement the following operations S1 and S2.

At operation S1, a path computation request (PCReq) message sent from a PCC is received. The PCReq message carries a constraint condition ID including at least one of a protocol ID, a multi-topology ID, a network slice ID, an application ID, or a traffic engineering (TE) target ID.

At operation S2, a TE path is computed according to the constraint condition ID, and a path computation reply (PCRep) message is returned to the PCC. The PCRep message carries the TE path.

The present disclosure further provides an electronic apparatus, including a memory and a processor. The memory has a computer program stored thereon, and the processor is configured to execute the computer program to implement the operations of the path computation method described with reference to FIG. 11.

According to an embodiment of the present disclosure, the electronic apparatus may further include a transmission device and an input/output device. The transmission device is coupled to the processor, and the input/output device is coupled to the processor.

According to an embodiment of the present disclosure, the processor may be configured to execute the computer program to implement the following operations S1 and S2.

At operation S1, a preset constraint condition ID is acquired, and a TE path is computed according to the constraint condition ID. The constraint condition ID includes at least one of a protocol ID, a multi-topology ID, a network slice ID, an application ID, or a TE target ID.

At operation S2, a path computation initiation (PCInitiate) message or a path computation update (PCUpd) message is sent to a PCC. The PCInitiate or PCUpd message carries the TE path.

The present disclosure further provides an electronic apparatus, including a memory and a processor. The memory has a computer program stored thereon, and the processor is configured to execute the computer program to implement the operations of the path computation method described with reference to FIG. 12.

According to an embodiment of the present disclosure, the electronic apparatus may further include a transmission device and an input/output device. The transmission device is coupled to the processor, and the input/output device is coupled to the processor.

According to an embodiment of the present disclosure, the processor may be configured to execute the computer program to implement the following operation S1.

At operation S1, a path computation initiation (PCInitiate) message or a path computation update (PCUpd) message sent from a PCE is received. The PCInitiate or PCUpd message carries a TE path that is computed by the PCE according to acquired preset constraint condition information. The constraint condition ID includes at least one of a protocol ID, a multi-topology ID, a network slice ID, an application ID, or a TE target ID.

Obviously, a person having ordinary skill in the art would understand that the above modules and operations of the present disclosure can be realized by using a universal computing device, can be integrated in a single computing device or distributed on a network that consists of a plurality of computing devices, and alternatively, can be realized by using the executable program code of the computing device, so that they can be stored in a storage device and executed by the computing device. In some cases, the shown or described operations can be performed in a sequence other than herein, or they are made into various integrated circuit modules respectively, or a plurality of modules or operations thereof are made into a single integrated circuit module, thus to be realized. In this way, the present disclosure is not restricted to any particular hardware and software combination.

The descriptions above are embodiments of the present disclosure, which are not used to restrict the present disclosure. For those having ordinary skill in the art, the present disclosure may have various changes and variations. Any modification, equivalent replacement, improvement and the like made within the principle of the present disclosure should be included in the protection scope of the present disclosure.

The invention claimed is:

1. A path computation method applied to a path computation client (PCC), comprising:

sending a path computation request (PCReq) message to a path computation element (PCE), wherein the PCReq message carries a constraint condition identifier (ID) comprising at least one of a protocol ID, a multi-topology ID, a network slice ID, an application ID, or a traffic engineering (TE) target ID, and the PCReq message is configured to instruct the PCE to compute a TE path according to the constraint condition ID; and receiving a path computation reply (PCRep) message returned from the PCE, wherein the PCRep message carries the TE path, wherein in a case of the constraint condition ID comprising the TE target ID, the method further comprises:

acquiring TE target information, wherein the TE target information is sent from a control device to the PCC and the PCE, and carries the TE target ID, TE target configuration and a correspondence relation between the TE target ID and the TE target configuration, wherein the TE target configuration is configured to indicate a set of preset constraint conditions.

2. The path computation method according to claim 1, wherein the protocol ID comprises at least one of a source protocol type ID or a protocol instance number ID.

3. The path computation method according to claim 1, wherein the application ID comprises at least one of a standard application ID or a user defined application ID.

4. The path computation method according to claim 1, wherein in a case of the PCE failing to compute the TE path according to the constraint condition ID, the PCRep message further carries a cause for the failing of computing for the TE path.

5. A path computation method applied to a path computation element (PCE), comprising:

receiving a path computation request (PCReq) message sent from a path computation client (PCC), wherein the PCReq message carries a constraint condition identifier (ID) comprising at least one of a protocol ID, a multi-topology ID, a network slice ID, an application ID, or a traffic engineering (TE) target ID; and computing a TE path according to the constraint condition ID and returning a path computation reply (PCRep) message to the PCC, wherein the PCRep message carries the TE path, wherein in a case of the constraint condition ID comprising the TE target ID, the method further comprises:

acquiring TE target information, wherein the TE target information is sent from a control device to the PCC and the PCE, and comprises the TE target ID, TE target configuration and a correspondence relation between the TE target ID and the TE target configuration, wherein the TE target configuration is configured to indicate a set of preset constraint conditions.

6. The path computation method according to claim 5, wherein the protocol ID comprises at least one of a source protocol type ID or a protocol instance number ID.

7. The path computation method according to claim 5, wherein the application ID comprises at least one of a standard application ID or a user defined application ID.

8. The path computation method according to claim 5, wherein in a case of the PCE failing to compute the TE path according to the constraint condition ID, the PCRep message further carries a cause for the failing of the computing for the TE path.

9. A path computation method applied to a path computation element (PCE), comprising:

acquiring a preset constraint condition ID, and computing a traffic engineering (TE) path according to the constraint condition ID, the constraint condition identifier (ID) comprising at least one of a protocol ID, a multi-topology ID, a network slice ID, an application ID, or a TE target ID; and sending a path computation initiation (PCInitiate) message or a path computation update (PCUpd) message to a path computation client (PCC), wherein the PCInitiate or PCUpd message carries the TE path, wherein in a case of the constraint condition ID comprising the TE target ID, the method further comprises:

acquiring TE target information, wherein the TE target information is sent from a control device to the PCC, and comprises the TE target ID, TE target configuration and a correspondence relation between the TE target ID and the TE target configuration, wherein the TE target configuration is configured to indicate a set of preset constraint conditions.

10. The path computation method according to claim 9, wherein the protocol ID comprises at least one of a source protocol type ID or a protocol instance number ID.

11. The path computation method according to claim 9, wherein the application ID comprises at least one of a standard application ID or a user defined application ID.

12. A non-transitory storage medium having a computer program stored thereon, wherein the computer program is configured to, when executed, cause the path computation method according to claim 1 to be implemented.

13. An electronic apparatus comprising a memory and a processor, wherein the memory has a computer program stored thereon, and the processor is configured to execute the computer program to implement the path computation method according to claim 1.

14. A non-transitory storage medium having a computer program stored thereon, wherein the computer program is configured to, when executed, cause the path computation method according to claim 5 to be implemented.

15. A non-transitory storage medium having a computer program stored thereon, wherein the computer program is configured to, when executed, cause the path computation method according to claim 9 to be implemented.

16. An electronic apparatus comprising a memory and a processor, wherein the memory has a computer program stored thereon, and the processor is configured to execute the computer program to implement the path computation method according to claim 5.

17. An electronic apparatus comprising a memory and a processor, wherein the memory has a computer program stored thereon, and the processor is configured to execute the computer program to implement the path computation method according to claim 9.

* * * * *